United States Patent
Takeda et al.

(10) Patent No.: US 11,241,945 B2
(45) Date of Patent: Feb. 8, 2022

(54) AUTOMOBILE DOOR GLASS RUN

(71) Applicants: Nishikawa Rubber Co., Ltd., Hiroshima (JP); MAZDA MOTOR CORPORATION, Hiroshima (JP)

(72) Inventors: Kazuyuki Takeda, Hiroshima (JP); Hirotaka Takaya, Aki-gun (JP); Kyohei Yukita, Hatsukaichi (JP); Naoyuki Takeshita, Hiroshima (JP); Shinsuke Hirao, Kure (JP)

(73) Assignees: Nishikawa Rubber Co., Ltd., Hiroshima (JP); MAZDA MOTOR CORPORATION, Hiroshima (JP)

( * ) Notice: Subject to any disclaimer, the term of this patent is extended or adjusted under 35 U.S.C. 154(b) by 271 days.

(21) Appl. No.: 16/206,312

(22) Filed: Nov. 30, 2018

(65) Prior Publication Data
US 2019/0193541 A1 Jun. 27, 2019

(30) Foreign Application Priority Data
Dec. 26, 2017 (JP) .............................. JP2017-248986

(51) Int. Cl.
| | |
|---|---|
| *B60J 10/76* | (2016.01) |
| *B60J 5/04* | (2006.01) |
| *B60J 10/88* | (2016.01) |
| *B60J 10/16* | (2016.01) |
| *B60R 13/04* | (2006.01) |
| *B60J 10/50* | (2016.01) |
| *B60J 10/265* | (2016.01) |

(52) U.S. Cl.
CPC ............ *B60J 10/76* (2016.02); *B60J 5/0402* (2013.01); *B60J 10/16* (2016.02); *B60J 10/50* (2016.02); *B60J 10/88* (2016.02); *B60R 13/04* (2013.01); *B60J 10/265* (2016.02)

(58) Field of Classification Search
CPC ... B60J 10/16; B60J 10/74; B60J 10/76; B60J 10/88; B60J 5/0402
See application file for complete search history.

(56) References Cited

U.S. PATENT DOCUMENTS

| | | | |
|---|---|---|---|
| 8,151,520 B2 * | 4/2012 | Yamashita | B60J 5/0402 49/502 |
| 10,766,433 B2 * | 9/2020 | Tomoyasu | B60R 13/04 |
| 2004/0006923 A1 * | 1/2004 | Nakanishi | B60J 5/0402 49/502 |

(Continued)

FOREIGN PATENT DOCUMENTS

| | | |
|---|---|---|
| DE | 10258825 B3 | 7/2004 |
| JP | S53-110657 A | 9/1978 |

*Primary Examiner* — Gregory J Strimbu
*Assistant Examiner* — Poras Pradipkumar Patel
(74) *Attorney, Agent, or Firm* — Renner, Otto, Boisselle & Sklar, LLP

(57) ABSTRACT

A molding configured not to be misaligned with a predetermined mounting position provides a vehicle with good appearance, avoids in advance interference with other parts when a door is opened or closed, and reduces wind noise while the vehicle is running. An end cap having a locking part is crimped to a rear end of a molding. An upper glass run has, at its rear end, an insertion slot into which the locking part is inserted. The locking part is inserted in the insertion slot and locked to the rear end of the upper glass run.

12 Claims, 15 Drawing Sheets

(56) References Cited

U.S. PATENT DOCUMENTS

| | | | |
|---|---|---|---|
| 2012/0174491 A1* | 7/2012 | Clark | B60J 10/32 49/490.1 |
| 2015/0202948 A1* | 7/2015 | Saiki | B60J 5/0402 49/502 |
| 2017/0001505 A1* | 1/2017 | Fukuta | B60J 10/88 |
| 2017/0015183 A1* | 1/2017 | Nam | B60J 10/265 |
| 2017/0341496 A1* | 11/2017 | Kojima | B60J 5/0402 |
| 2018/0037100 A1* | 2/2018 | Mori | B60J 10/88 |

* cited by examiner

OUTSIDE OF VEHICLE CABIN ←          → INSIDE OF VEHICLE CABIN

OUTSIDE OF VEHICLE CABIN ←

→ INSIDE OF VEHICLE CABIN

AUTOMOBILE DOOR GLASS RUN

CROSS-REFERENCE TO RELATED APPLICATION

This application claims priority to Japanese Patent Application No. 2017-248986 filed on Dec. 26, 2017, the entire disclosure of which is incorporated by reference herein.

BACKGROUND

The present disclosure relates to a glass run mounted on a window frame of an automobile door.

There are several types of side doors for automobiles. One of the side doors, for example, has a window frame for holding the periphery of a window glass. The side door having such a window frame includes a glass run for providing a seal between the window frame and the window glass (see, for example, German Patent No. 10258825).

The glass run disclosed in German Patent No. 10258825 can be mounted to the window frame from outside a vehicle cabin. Such a glass run which can be mounted to the window frame from outside, just like that disclosed in German Patent No. 10258825, is called a "hiding-type" glass run that partially covers the window frame from outside the cabin, and is sometimes used, for example, to satisfy requirements for vehicle design.

The glass run described in German Patent No. 10258825 includes a glass run body having an insertion channel in which a glass run attachment plate of a window frame is inserted, and a molding mounted to an outer side of the glass run body facing outside the vehicle cabin. The glass run attachment plate extends from an upper portion of the window frame toward the outside of a vehicle cabin. The molding which determines part of the vehicle design, is a generally made of hard material such as stainless steel or aluminum, and elongated in a longitudinal direction of the vehicle along the glass run body.

The molding described in German Patent No. 10258825 includes a positioning member at a longitudinal end thereof for positioning the molding with respect to the glass run body. The positioning member includes a base secured to the longitudinal end of the molding and a mandrel projecting from the base in the longitudinal direction of the molding. The mandrel is inserted in the glass run body through an opening formed at an end of the glass run body.

The molding described in German Patent No. 10258825 can be moved in the longitudinal direction of the vehicle relative to the glass run body to be mounted to the glass run body. Once the molding is assembled, the mandrel of the positioning member is inserted into the glass run body, but the mandrel, which is simply inserted in the glass run body, easily moves in the direction away from the glass run body. For example, if an external force is applied to the molding in the longitudinal direction of the vehicle, the mandrel of the positioning member easily moves in the direction away from the glass run body, and the molding is misaligned with a predetermined mounting position in the longitudinal direction of the vehicle.

Suppose that a molding similar to that described in German Patent No. 10258825 mounted to the glass run body is located at, for example, an upper rear position of a front door of a vehicle as illustrated in FIG. 1 and the molding is misaligned with the predetermined mounting position in the longitudinal direction of the vehicle. In this situation, a gap between the molding (front door molding) and other parts of a rear door (e.g., a rear door molding) is narrowed. This may spoil the appearance of the vehicle, and the front door molding may interfere with other parts of the rear door when the door is opened or closed. In particular, the gap between the front and rear door moldings at a center pillar of a vehicle is of great importance because it greatly affects the appearance of the vehicle. In addition, the misalignment of the molding broadens the gap between an end of the molding and an end of the glass run body in the longitudinal direction, which may be a cause of increased wind noise while the vehicle is running.

SUMMARY

In view of the foregoing, the present disclosure has been achieved. An object of the present disclosure is to provide an automobile door glass run that reduces or prevents misalignment of a molding with a predetermined mounting position, thereby providing a vehicle with good appearance, avoiding in advance interference with other parts when the door is opened or closed, and reducing wind noise while the vehicle is running.

To achieve the object, a first aspect of the present disclosure is directed to an automobile door glass run mounted to an outer side, facing outside a vehicle cabin, of a window frame defining a window opening of an automobile door to provide a seal between the window frame and a window glass, the automobile door glass run. The automobile door glass run includes: a glass run body that includes an upper glass run which is mounted to a glass run mount plate extending toward an outside of the vehicle cabin from an upper portion of the window frame, the upper glass run extending in a vehicle longitudinal direction; and a molding which is mounted to an outer side, facing outside the vehicle cabin, of the upper glass run and extending in the vehicle longitudinal direction. The molding has, at an upper side and lower side thereof, an upper fitting portion and a lower fitting portion which are fitted to the outer side of the upper glass run and extend in the vehicle longitudinal direction, the upper glass run has, at the outer side thereof, fitting portions which extend in the vehicle longitudinal direction and to which the upper and lower fitting portions are fitted, a positioning member is secured to an end of the molding in the vehicle longitudinal direction, the positioning member including a locking part projecting toward another end of the molding, the upper glass run has an insertion slot formed at an end thereof in the vehicle longitudinal direction so that the locking part of the positioning member is inserted in the insertion slot, and the locking part of the positioning member is inserted in the insertion slot and is locked to the upper glass run.

According to this configuration, in the assembly of the glass run body, ends of the fitting portions at the outer side of the upper glass run are respectively fitted with ends of the upper and lower fitting portions of the molding, and then the upper glass run is allowed to slide relative to the molding in the vehicle longitudinal direction. This can facilitate the assembly of the glass run body to the molding by means of the positioning member.

When the molding is mounted to the upper glass run, the locking part of the positioning member is inserted in the insertion slot of the upper glass run and is locked to the upper glass run. Thus, the locking part of the positioning member does not easily come out of the insertion slot of the upper glass run even if external force is applied to the molding in the vehicle longitudinal direction, thereby preventing or reducing misalignment of the molding with a predetermined mounting position. This keeps a gap of a predetermined size between the molding and other parts of the vehicle, and thus provides the vehicle with good appearance and prevents the molding from interfering with other parts when the door is opened or closed. Since the molding is not displaced, an increase in wind noise can be reduced while the vehicle is running.

A second aspect of the present disclosure is an embodiment of the first aspect. In the second aspect, the positioning member is an end cap formed to cover an end surface of the molding.

In this configuration, the positioning member, which is an end cap, covers the end surface of the molding, thereby providing the vehicle with more sophisticated appearance.

A third aspect of the present disclosure is an embodiment of the first aspect. In the third aspect, the upper glass run includes an outer vertical plate disposed at the outer side of the upper glass run and extending in a vertical direction, and an inner plate covering an inner side, facing inside the vehicle cabin, of the outer vertical plate to form the insertion slot between the outer vertical plate and the inner plate, a peripheral portion of the insertion slot in the inner plate is a protruding portion protruding toward the outside of the vehicle cabin, and the locking part of the positioning member has a raised portion raised toward the inside of the vehicle cabin to be engaged with the protruding portion.

In this configuration, the insertion slot is formed between the outer vertical plate and inner plate of the upper glass run. When the locking part of the positioning member is inserted in the insertion slot, the raised portion of the locking part is engaged with the protruding portion that is the peripheral portion of the insertion slot. As a result, the locking part does not easily come out of the insertion slot.

A fourth aspect of the present disclosure is an embodiment of the first aspect. In the fourth aspect, the locking part of the positioning member includes a plurality of locking parts spaced apart from each other in the vertical direction, and the plurality of locking parts are inserted in the insertion slot and are locked to the upper glass run.

In this configuration, a plurality of locking parts is locked to the upper glass run, and thus, the positioning member is more firmly secured.

A fifth aspect of the present disclosure is an embodiment of the second aspect. In the fifth aspect, an end surface of the positioning member in the vehicle longitudinal direction and an end surface of the upper glass run in the vehicle longitudinal direction are substantially flush with each other.

In this configuration, the end surfaces of the positioning member and the upper glass run are substantially flush with each other. This can provide the vehicle with more sophisticated appearance.

A sixth aspect of the present disclosure is an embodiment of the third aspect. In the sixth aspect, the positioning member includes a fixture plate extending along an inner surface, facing inside the vehicle cabin, of the molding and fixed to the molding, and the outer vertical plate is disposed between the locking part and the fixture plate.

In this configuration, the fixture plate of the positioning member is fixed along the inner surface of the molding. When the locking part of the positioning member is inserted into the insertion slot of the upper glass run, the outer vertical plate of the upper glass run is positioned between the locking part and the fixture plate of the positioning member. Thus, the positioning member is not easily displaced from the predetermined mounting position in the widthwise direction of the vehicle cabin.

A seventh aspect of the present disclosure is an embodiment of the second aspect. In the seventh aspect, the positioning member includes a cover plate extending in the vertical direction to cover the end surface of the molding, and the locking part is integrally formed with an inner side, facing inside the vehicle cabin, of the cover plate.

Since the cover plate covers the end surfaces of the molding and the upper glass run, the vehicle can be provided with more sophisticated appearance.

According to the first aspect, the positioning member including the locking part is secured to an end of the molding in the vehicle longitudinal direction, and the locking part is inserted in the insertion slot formed at an end of the upper glass run in the vehicle longitudinal direction and locked to the upper glass run. Thus, the molding is not misaligned with a predetermined mounting position. This can provide the vehicle with good appearance, prevent the molding from interfering with other parts when the door is opened or closed, and reduce wind noise while the vehicle is running.

According to the second aspect, the positioning member, which is an end cap, covers the end surface of the molding. This can make the vehicle appearance more sophisticated.

According to the third aspect, the insertion slot is formed between the outer vertical plate and inner plate of the upper glass run. The locking part of the positioning member is inserted in the insertion slot, and the raised portion of the locking part can be engaged with the protruding portion that is a peripheral portion of the insertion slot. This configuration can substantially prevent the locking part from being disengaged with the insertion slot and prevent the misalignment of the molding.

According to the fourth aspect, a plurality of locking parts is locked to the upper glass run, as a result of which the positioning member can be more firmly secured.

According to the fifth aspect, the end surfaces of the positioning member and the upper glass run in the vehicle longitudinal direction are substantially flush with each other, which can provide the vehicle with more sophisticated appearance.

According to the sixth aspect, the outer vertical plate of the upper glass run is positioned between the locking part and the fixture plate of the positioning member. This can prevent the positioning member from being easily displaced from a predetermined mounting position in the widthwise direction of the vehicle cabin, thereby providing the vehicle with more sophisticated appearance.

According to the seventh aspect, the cover plate covers the end surfaces of the molding and the upper glass run. This can provide the vehicle with more sophisticated appearance.

DETAILED DESCRIPTION

Embodiments of the present disclosure will be described in detail with reference to the accompanying drawings. The embodiments to be described below are merely exemplary ones in nature, and do not intend to limit the scope of the present invention or applications or use thereof.

First Embodiment

Figure 1:
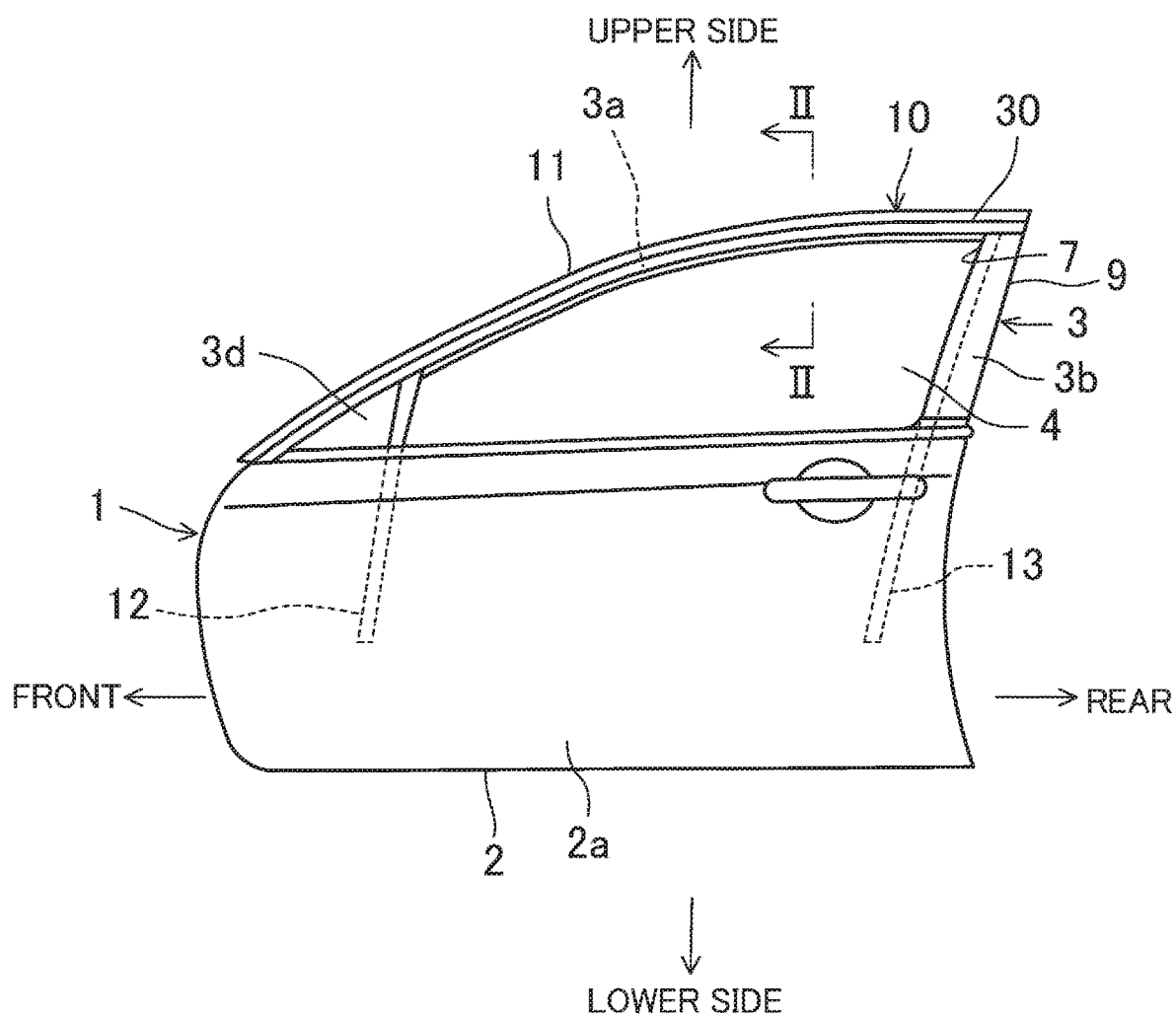
FIG. 1 is a left side view of an automobile door to which an automobile door glass run according to a first embodiment of the present disclosure is mounted.

FIG. 1 is a side view of a left front door (automobile door) 1 including a left front door glass run (automobile door glass run) 10 according to a first embodiment of the present disclosure as seen from the outside (left side) of a vehicle cabin. The left front door 1 is disposed at the front left side of an automobile (not illustrated) to open or close an opening (not illustrated) at the front left of the automobile. Although not illustrated, a right front door is disposed symmetrically to the left front door. Further, left and right rear doors, which are not shown, can include the automobile door glass run according to the present disclosure. The automobile door glass run according to the present disclosure may also be applied to sliding doors.

In the present embodiment, the front side of the vehicle will be simply referred to as "front," and the rear side of the vehicle will be simply referred to as "rear."

(Structure of Door)

As illustrated in FIG. 1, the left front door 1 includes a door body 2 comprising almost lower half of the left front door 1, and a window frame 3 comprising almost upper half of the left front door 1. Although not illustrated, a front end of the door body 2 is attached to a pillar of a vehicle body via hinges including a vertically extending rotational shaft. The door body 2 is made of an inner panel (not illustrated) and an outer panel 2a that are made of, for example, steel sheets. The door body 2 can accommodate therein, for example, a window glass 4 that can be moved up and down in the door body 2, and a lifting apparatus (not illustrated) which moves the window glass 4 up and down.

Figure 2:
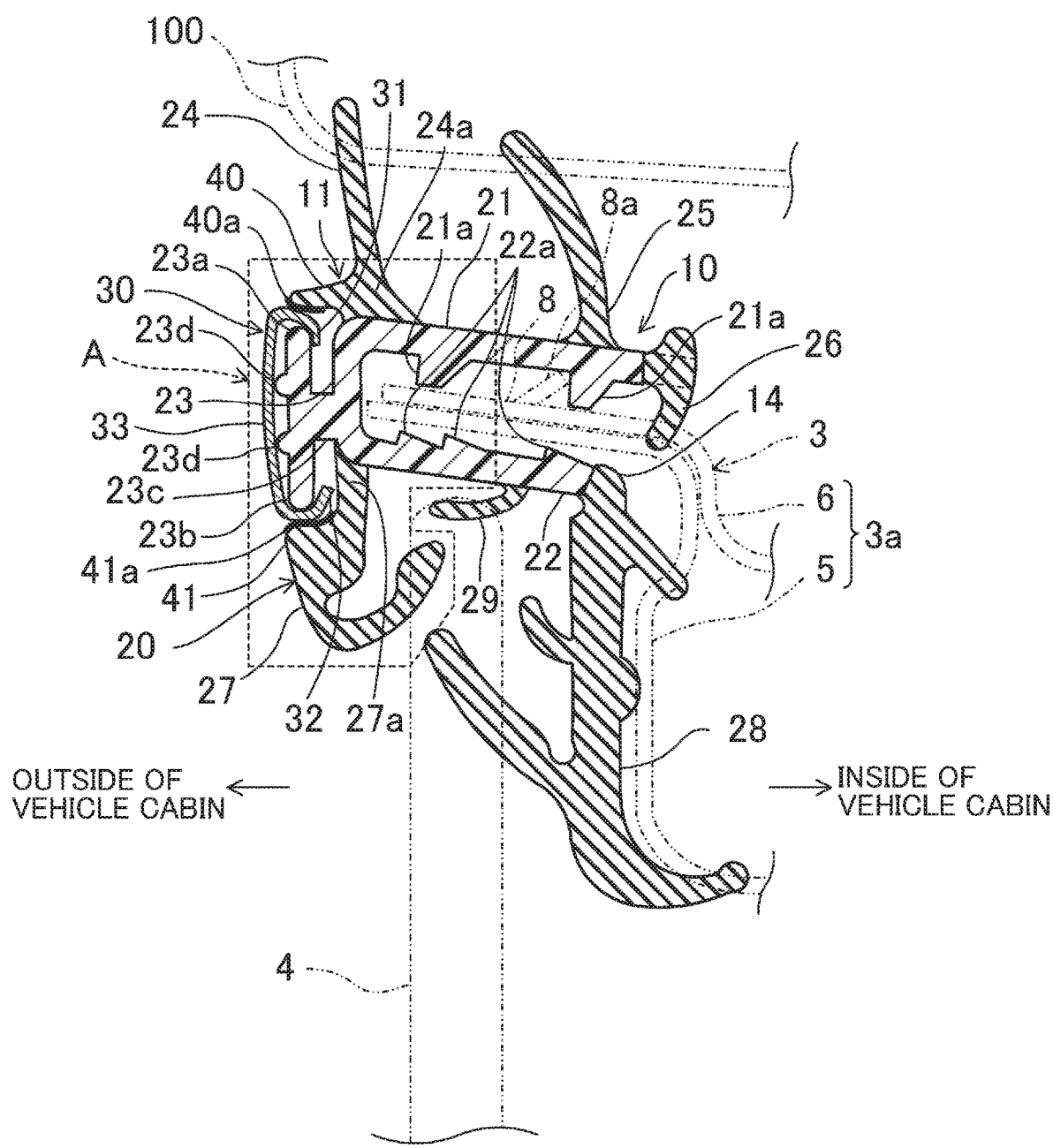
FIG. 2 is a cross-sectional view taken along line II-II in FIG. 1.

The window frame 3 functions as a sash for holding the periphery of the window glass 4, and defines a window opening 7. The window opening 7 defined by the window frame 3 is covered or uncovered with the window glass 4. The window frame 3 in the present embodiment is fabricated by assembling an outer panel member 5 and an inner panel member 6 that are, for example, press-formed steel plates as illustrated in FIG. 2. The window frame 3 may be fabricated by, for example, roll forming.

As illustrated in FIG. 1, the window frame 3 includes an upper frame portion 3a and a rear frame portion 3b. The upper frame portion 3a protrudes upward from a front portion of an upper edge of the door body 2 and is curved to be positioned higher as it goes rearward. The rear frame portion 3b extends upward from a rear portion of the upper edge of the door body 2. An upper end of the rear frame portion 3b is connected to a rear end of the upper frame portion 3a to form the window frame 3.

The shape of the window frame 3 is not limited to the shape illustrated in the drawings. The window frame 3 may be generally curved upward, or may have a curved portion suitably positioned, or an inclination angle and curvature suitably determined, in association with the roof shape of the vehicle body. The window frame 3 may include a front frame portion (not illustrated) vertically extending from the front of the window frame 3. Further, a door mirror mount 3d to which a door mirror (not illustrated) is attached is provided forward of the window frame 3.

As illustrated in FIG. 2, the upper frame portion 3a of the window frame 3 includes a glass run mount plate 8 extending outward of the vehicle cabin. The glass run mount plate 8 is made of outer portions of the outer and inner panel members 5 and 6 toward the outside of the vehicle cabin. In other words, the outer portion of the outer panel member 5 extends substantially horizontally and is continuous in the longitudinal direction. The outer portion of the inner panel member 6 also extends substantially horizontally and is continuous in the longitudinal direction. An upper surface of the outer portion of the outer panel member 5 is in contact with a lower surface of the outer portion of the inner panel member 6 to form the glass run mount plate 8. The glass run mount plate 8 may be formed only by the outer panel member 5 or the inner panel member 6 instead of using both the outer panel member 5 and the inner panel member 6.

A garnish 9 made of, for example, a resin plate, is attached to an outer surface, of the rear frame portion 3b of the window frame 3, facing outside the vehicle cabin. The garnish 9 extends in the vertical direction along the outer surface of the rear frame portion 3b to cover the outer surface. An upper end of the garnish 9 reaches a rear end of the upper frame portion 3a. The garnish 9 may be omitted.

(Structure of Automobile Door Glass Run)

The left front door glass run 10 is configured to hide at least the outer side of the window frame 3 facing outside the vehicle cabin, and is a hiding type glass run. As will be described in detail later, the glass run 10 is mounted to the upper frame portion 3a of the window frame 3 from outside of the vehicle cabin, and functions as a seal member for providing a seal between the window frame 3 and the window glass 4. The left front door glass run 10 is formed to cover the glass run mount plate 8 which is the outer portion of the window frame 3 facing outside of the vehicle cabin.

As illustrated in FIG. 1, the left front door glass run 10 includes an upper glass run 11, a front vertical glass run 12, and a rear vertical glass run 13. The upper glass run 11, the front vertical glass run 12, and the rear vertical glass run 13 are integrally formed. The upper glass run 11 extends in the longitudinal direction along the upper frame portion 3a of the window frame 3, and is mounted to the glass run mount plate 8 and curves along the upper frame portion 3a. The upper glass run 11 is arranged to be positioned higher as it goes rearward.

The front vertical glass run 12 extends downward from a portion of the upper glass run 11 slightly rearward of the front end thereof. The rear vertical glass run 13 extends downward from a portion of the upper glass run 11 slightly forward of the rear end thereof. In this regard, the rear end of the upper glass run 11 is located further rearward of the rear vertical glass run 13, and is substantially aligned with a rear end of the garnish 9.

Lower ends of the front and rear vertical glass runs 12 and 13 extend to the inside of the door body 2. The front and rear vertical glass runs 12 and 13 guide front and rear sides of the window glass 4, respectively, in the vertical direction.

As illustrated in FIG. 2, the upper glass run 11 of the left front door glass run 10 includes a glass run body 20 having an insertion channel 14 in which the glass run mount plate 8 is inserted, and a molding 30 which is mounted to the outer side of the glass run body 20 facing outside the vehicle cabin and extends in the longitudinal direction. The molding 30 is attached only to the glass run body 20 of the upper glass run 11. The molding 30 is not attached to the front vertical glass run 12 or the rear vertical glass run 13. The molding 30 extends along the upper window frame 3a of the vehicle, and may be referred to as a "sash molding."

The glass run body 20 includes an upper plate 21 extending along the upper surface of the glass run mount plate 8, a lower plate 22 extending along the lower surface of the glass run mount plate 8, and an outer plate 23 vertically extending from an outer end, facing outside the vehicle cabin, of the upper plate 21 to an outer end, facing outside the vehicle cabin, of the lower plate 22. The upper plate 21, the lower plate 22, and the outer plate 23 are integrally formed.

The insertion channel 14 in which the glass run mount plate 8 is inserted is formed between the upper plate 21 and the lower plate 22. The insertion channel 14 has an opening defined by inner ends, toward the inside of the vehicle cabin, of the upper and lower plates 21 and 22, and extends in the longitudinal direction. A bottom of the insertion channel 14 is defined by the outer plate 23. The depth of the insertion channel 14 and the dimension of the glass run mount plate 8 in a widthwise (left-right) direction of the vehicle cabin are determined such that the outer end of the glass run mount plate 8 reaches the vicinity of the bottom of the insertion channel 14 when the glass run body 20 is mounted to the glass run mount plate 8.

The upper plate 21, the lower plate 22, and the outer plate 23 are made of a high-stiffness material having a flexural modulus of 2000 MPa or higher and 5000 MPa or lower. Examples of such a high-stiffness material include, but not limited to, hard resin (e.g., polypropylene mixed with talc or glass fibers). Other materials or various compound materials may be used. Since the upper plate 21, the lower plate 22, and the outer plate 23 are made of the high-stiffness material, the stiffness of the upper plate 21, the lower plate 22, and the outer plate 23 is sufficiently increased to prevent, in particular, a gap between the upper plate 21 and the lower plate 22 from widening. This allows the upper plate 21 and the lower plate 22 to firmly sandwich the glass run mount plate 8 in the vertical direction when the glass run body 20 is mounted to the glass run mount plate 8, thereby preventing easy disengagement of the left front door glass run 10 from the glass run mount plate 8. Accordingly, the left front door glass run 10 can be firmly attached.

On the lower surface of the upper plate 21, a plurality of upper fitting protrusions 21a protruding downward are formed apart from each other in the widthwise direction of the vehicle cabin. Lower ends of the upper fitting protrusions 21a may be in contact with the upper surface of the glass run mount plate 8. One of the upper fitting protrusions 21a located further inside of the vehicle cabin than the other makes contact with, and engages with, a raised portion 8a protruding upward from the upper surface of the glass run mount plate 8 from the inside of the vehicle cabin. As a result, the left front door glass run 10 does not easily disengage with the glass run mount plate 8.

On the upper surface of the lower plate 22, a plurality of lower fitting protrusions 22a protruding upward are formed apart from each other in the widthwise direction of the vehicle cabin. Upper ends of the lower fitting protrusions 22a may be in contact with the lower surface of the glass run mount plate 8. A distance between the upper ends of the lower fitting protrusions 22a and the lower ends of the upper fitting protrusions 21a may be equal to the thickness of the glass run mount plate 8, or may be slightly larger than the thickness to facilitate mounting work.

An upwardly protruding upper seal lip 24 is formed on an upper portion of the glass run body 20 facing outside the vehicle cabin. The upper seal lip 24 is bent outward of the vehicle cabin upon contact with a vehicle body 100 of the automobile. The upper seal lip 24 has a base integrally bonded to an outer portion of the upper surface of the upper plate 21 toward the outside of the vehicle cabin. When the upper seal lip 24 is not in contact with the vehicle body 100 of the automobile, that is, when the left front door 1 is open, the upper seal lip 24 is substantially upright as illustrated in FIG. 2. Although not illustrated, when the upper seal lip 24 is in contact with the vehicle body 100 of the automobile, that is, when the left front door 1 is closed, the upper seal lip 24 is pushed obliquely downward toward the outside of the vehicle cabin by the vehicle body 100, and the upper seal lip 24 is elastically deformed with its distal end being positioned further outside of the vehicle cabin than the base, making close contact with the vehicle body 100. Thus, the upper seal lip 24 can provide a seal. The vehicle body 100 is made of, for example, a steel sheet body panel, and may take any form.

An inner seal lip 25 protrudes diagonally upward to the outside of the vehicle cabin from an upper surface of the inner portion of the glass run body 20 facing inside the vehicle cabin. The inner seal lip 25 is bent outward of the vehicle cabin upon contact with the vehicle body 100 of the automobile. The inner seal lip 25 has a base integrally bonded to an inner portion, of the upper surface of the upper plate 21. When the inner seal lip 25 is not in contact with the vehicle body 100 of the automobile, that is, when the left front door 1 is opened, the inner seal lip 24 stands diagonally upward toward the outside of the vehicle cabin as illustrated in FIG. 2. Although not illustrated, when the inner seal lip 25 is in contact with the vehicle body 100 of the automobile, that is, when the left front door 1 is closed, the inner seal lip 25 is pushed obliquely downward toward the outside of the vehicle cabin by the vehicle body 100, and the inner seal lip 25 is elastically deformed with its distal end being closer to a thick base portion 24a of the upper seal lip 24, making close contact with the vehicle body 100. Thus, the inner seal lip 25 can provide a seal.

A downwardly protruding inner seal part 26 is disposed at an inner end of the upper plate 21 facing inside the vehicle cabin. The inner seal part 26 is integrally bonded to the inner end of the upper plate 21. A lower end of the inner seal part 26 is in contact with the upper surface of the glass run mount plate 8.

A downwardly protruding lower seal part 27 is disposed at a loser surface of an outer portion of the glass run body 20 facing outside the vehicle cabin. A base portion 27a of the lower seal part 27 is integrally bonded to an outer portion of the lower surface of the lower plate 22 facing outside the vehicle cabin. A lower portion of the lower seal part 27 is bent toward the inside of the vehicle cabin. The lower portion of the lower seal part 27 is supposed to be in contact with the outer surface of the window glass 4 facing outside the vehicle cabin when the window glass 4 is closed.

A downwardly protruding lower seal part 28 is disposed at a lower portion of the glass run body 20 facing inside the vehicle cabin. A base of the lower seal part 28 is integrally bonded to the inner end surface of the lower plate 22 facing inside the vehicle cabin. A lower portion of the lower seal part 28 is bent toward the inside of the vehicle cabin. The lower portion of the lower seal part 28 is supposed to be contact with the outer panel member 5 of the window frame 3. The lower seal part 28 is also supposed to be in contact with the inner surface of the window glass 4 facing inside the vehicle cabin when the window glass 4 is closed.

On the lower surface of the lower plate 22, an intermediate seal lip 29 is disposed between the base of the lower seal part 27 and the base of the lower seal part 28. A base of the intermediate seal lip 29 is integrally bonded to a center portion of the lower surface of the lower plate 22 in the widthwise direction of the vehicle cabin. The intermediate seal lip 29 extends diagonally downward toward the outside of the vehicle cabin, and is supposed to be in contact with the upper end of the window glass 4 when the window glass 4 is closed.

The upper seal lip 24, the inner seal lip 25, the inner seal part 26, the lower seal part 27, the lower seal part 28, and the intermediate seal lip 29 are integrally bonded to the members (upper plate 21, lower plate 22, and outer plate 23) made of a high-stiffness material. In this regard, if these seal lips and seal parts are made of a softer and more elastically deformable material than the high-stiffness material, they can keep their shapes when mounted. The upper seal lip 24, the inner seal lip 25, the inner seal part 26, the lower seal part 27, the lower seal part 28, and the intermediate seal lip 29 may be made of an elastic material such as ethylene-propylene-diene-rubber (EPDM) or olefin-based thermoplastic elastomer (TPO). The EPDM or TPO may be foamed or solid. When hard resin such as polypropylene is used as the high-stiffness material above, TPO is preferred.

The upper seal lip 24, the inner seal lip 25, the inner seal part 26, the lower seal part 27, the lower seal part 28, and the intermediate seal lip 29 constitute the glass run body 20 together with the upper plate 21, the lower plate 22, and the outer plate 23.

The molding 30 illustrated in FIG. 1 is a member forming part of the vehicle design, and typically made of hard material such as stainless steel or aluminum. In the present embodiment, the molding 30 is made of a stainless steel sheet. The molding 30 is a long member extending in the longitudinal direction along the glass run body 20. A front end of the molding 30 is located near the front end of the upper frame portion 3a of the window frame 3, and a rear end of the molding 30 is located near the rear end of the upper frame portion 3a of the window frame 3.

Figure 3:
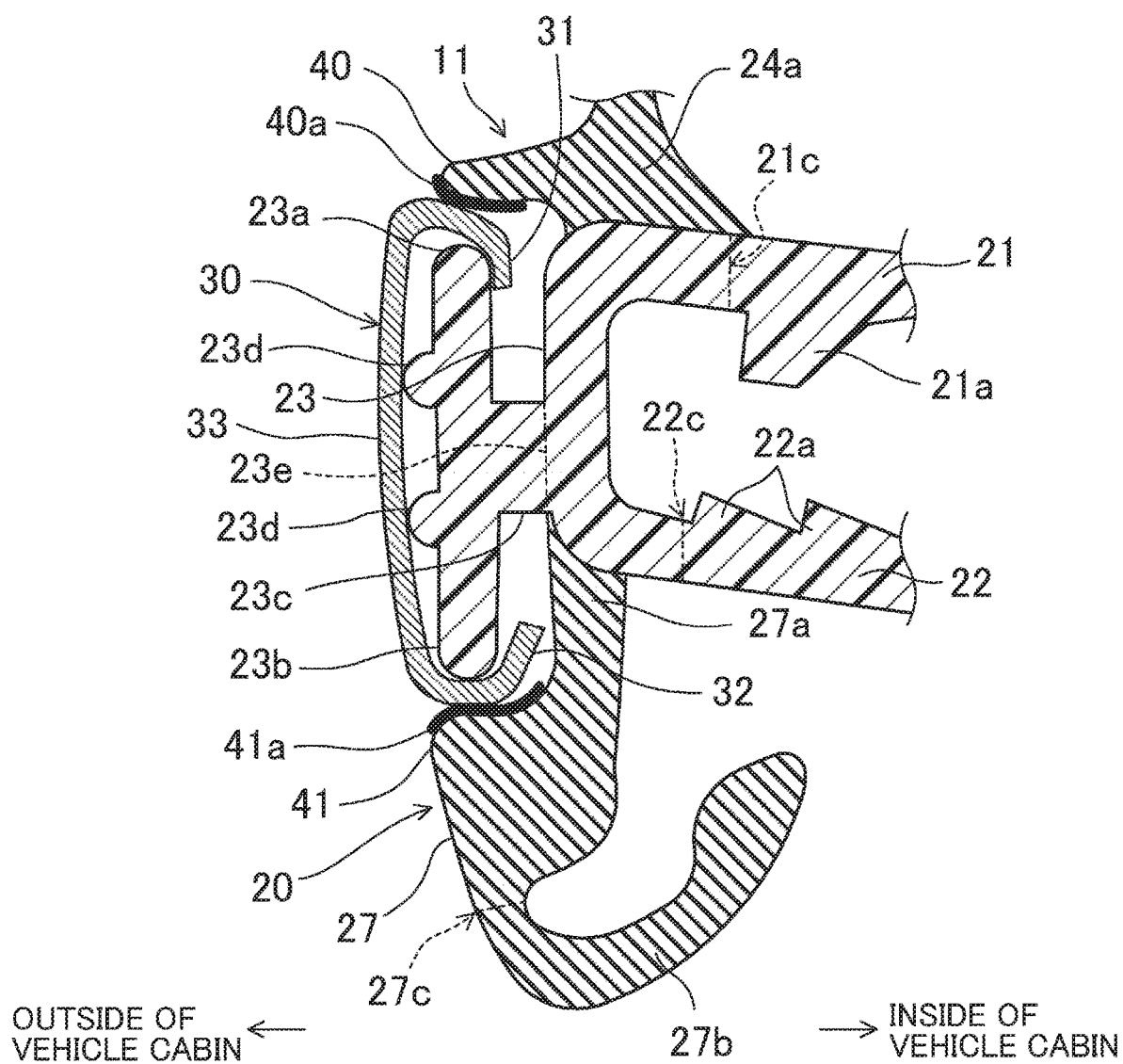
FIG. 3 is an enlarged view of part A in FIG. 2.
Figure 4:
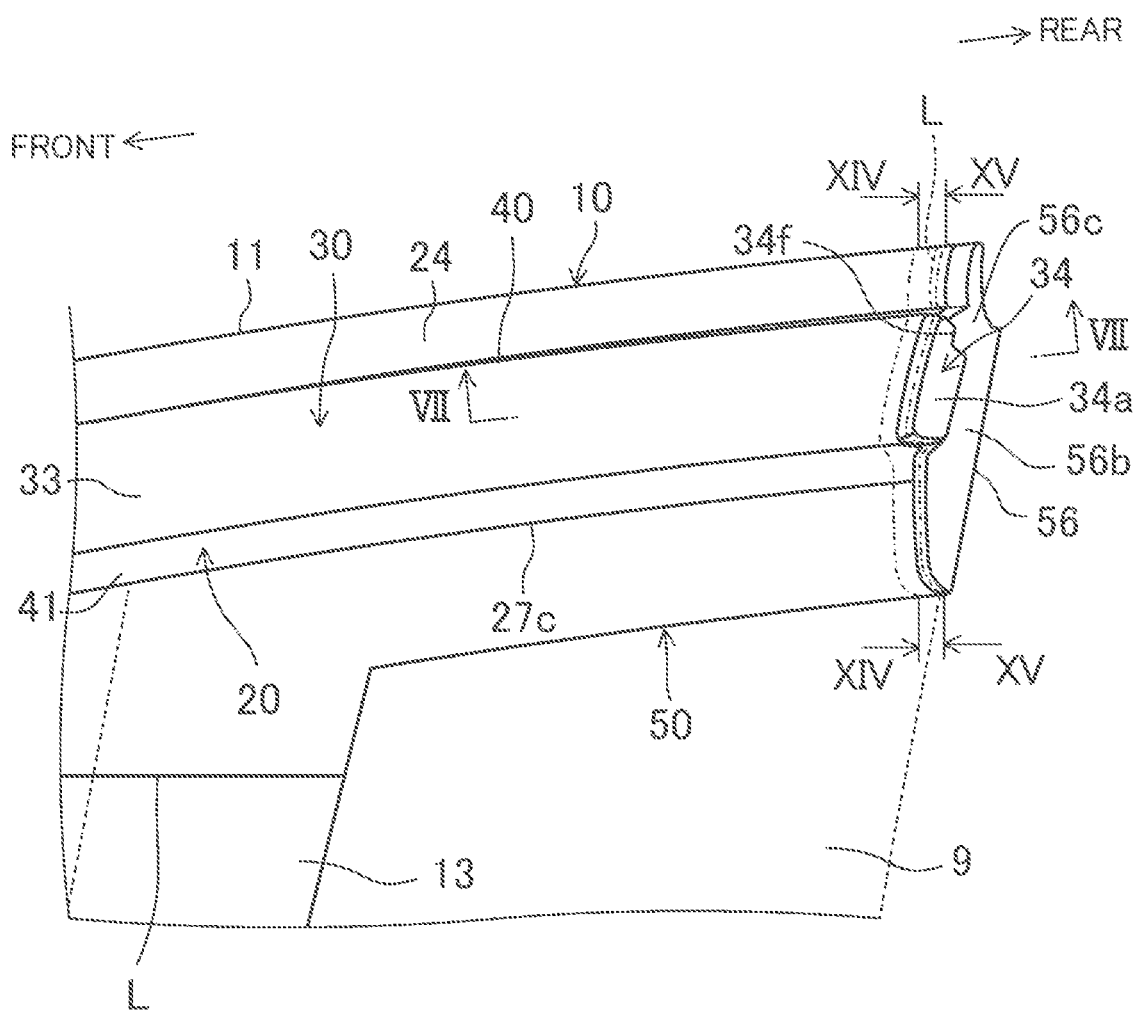
FIG. 4 is a perspective view of an upper rear portion of the automobile door glass run as viewed from outside of a vehicle cabin.

As illustrated in FIGS. 2 and 3, the molding 30 has upper and lower fitting portions 31 and 32 extending along the upper and lower sides thereof in the longitudinal direction and fitted to the outer side of the glass run body 20 facing outside the vehicle cabin. The upper fitting portion 31 is bent toward the inside of the vehicle cabin and then downward to have a downward opening. The lower fitting portion 32 is bent inward toward the vehicle cabin and then upward to have an upward opening. A portion between the upper fitting portion 31 and the lower fitting portion 32 of the molding 30 is a design portion 33 gently curved toward the outside of the vehicle cabin.

Figure 6:
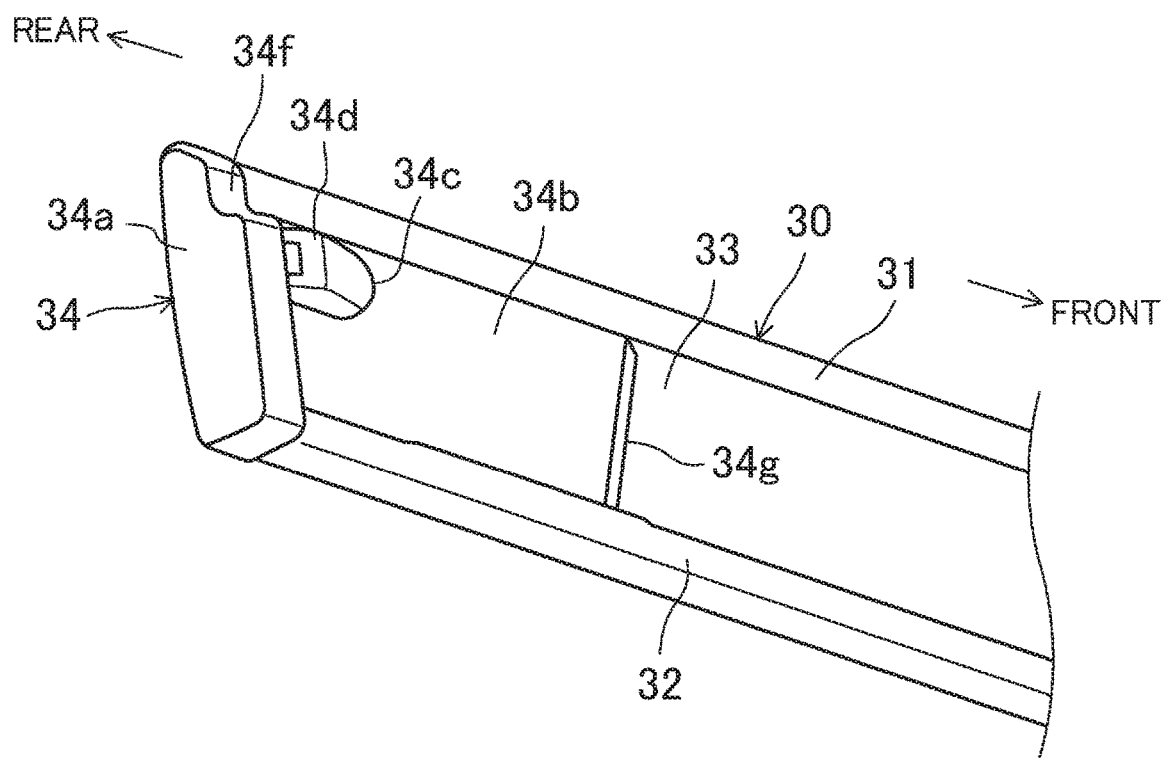
FIG. 6 is a perspective view illustrating a rear portion of the molding as seen from inside of the vehicle cabin.

As illustrated in FIG. 6, an end cap 34 is secured to a rear end (an end in the vehicle longitudinal direction) of the molding 30. The end cap 34 functions as a positioning member for positioning the molding 30 relative to the upper glass run 11. The end cap 34 is a resin member formed to cover the rear end surface of the molding 30 from the rear side.

Figure 15:
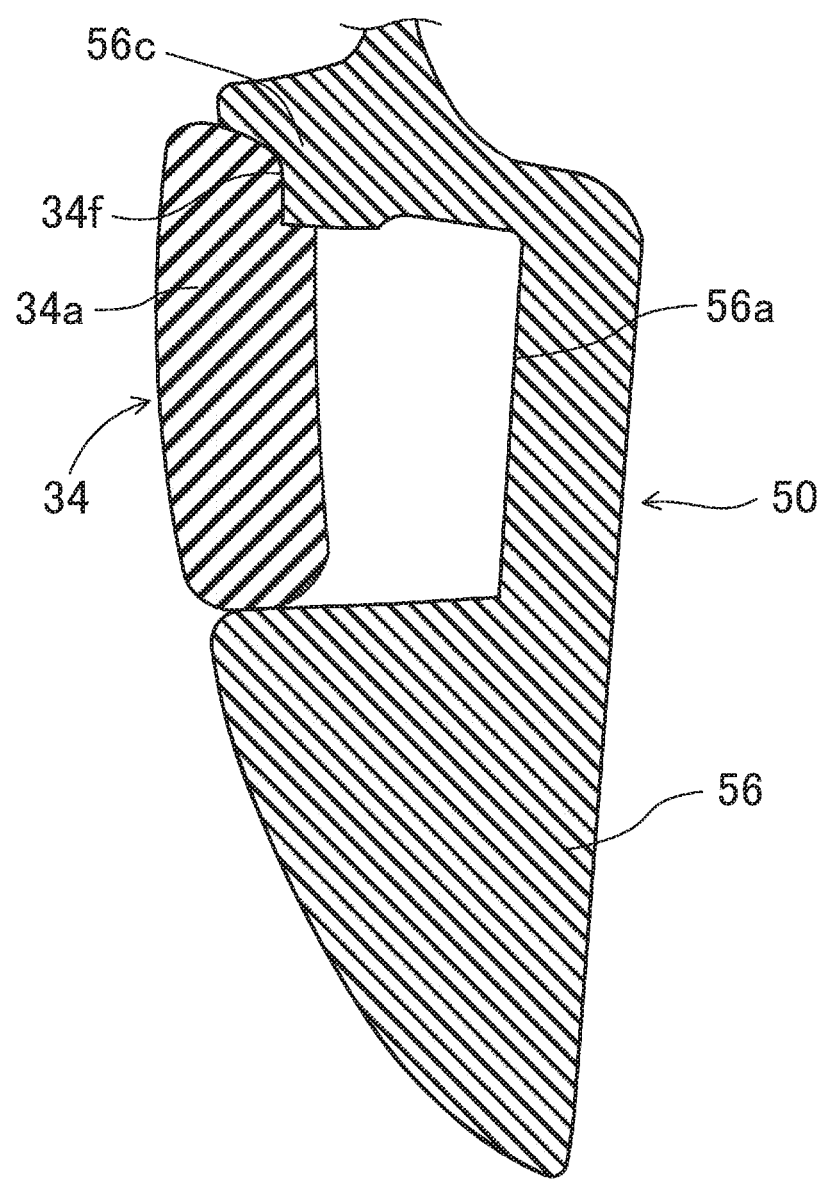
FIG. 15 is a cross-sectional view taken along line XV-XV in FIG. 4.

The end cap 34 includes a cover plate 34a, a fixture plate 34b, and a locking part 34c, which are integrally formed. The cover plate 34a extends in the vertical direction to cover the rear end surface of the molding 30. An upper end of the cover plate 34a is located at the same level as the upper end of the molding 30, and a lower end of the cover plate 34a is located at the same level as the lower end of the molding 30. In other words, the shape and size of the cover plate 34a are determined such that the rear end surface of the molding 30 is fully covered to be invisible when the molding 30 to which the end cap 34 is secured is seen from the rear end. The vertical dimension of the cover plate 34a is larger than the dimension of the cover plate 34a in the widthwise direction of the vehicle cabin. As illustrated in FIGS. 4, 6, 8, 11 and 13, an upper portion, of the cover plate 34a, facing inside the cabin is cut out to form a recess 34f. As illustrated in FIG. 15, an inner plate 56 of a glass run die-molded portion 50 has a raised portion 56c which can engage with the recess 34f and the recess 34f is fitted with the raised portion 56c. This structure allows the cover plate 34a of the end cap 34 crimped to the molding 30 to be located at the exact position in both the widthwise direction of the vehicle cabin and the vertical direction of the vehicle in the vicinity of the rear end of the upper glass run 11.

The fixture plate 34b extends along an inner surface, of the design portion 33 of the molding 30, facing inside the vehicle cabin, and is fixed to the molding 30. The upper end of the fixture plate 34b reaches the inside of the upper fitting portion 31, and the upper fitting portion 31 fixes an upper end of the fixture plate 34b in the thickness direction (widthwise direction of the vehicle cabin). The lower end of the fixture plate 34b reaches the inside of the lower fitting portion 32, and the lower fitting portion 32 fixes a lower end of the fixture plate 34b in the thickness direction (widthwise direction of the vehicle cabin). In other words, the upper and lower ends of the fixture plate 34b are securely crimped by the upper and lower portions of the molding 30, which makes the end cap 34 immovable in the longitudinal direction, in the widthwise direction of the vehicle cabin, or in the vertical direction relative to the molding 30. To crimp the end cap 34 to the molding 30, the method disclosed in FIG. 4 of Japanese Patent No. 3371702 or other known methods can be used, and the details thereof will not be described herein.

Figure 7:
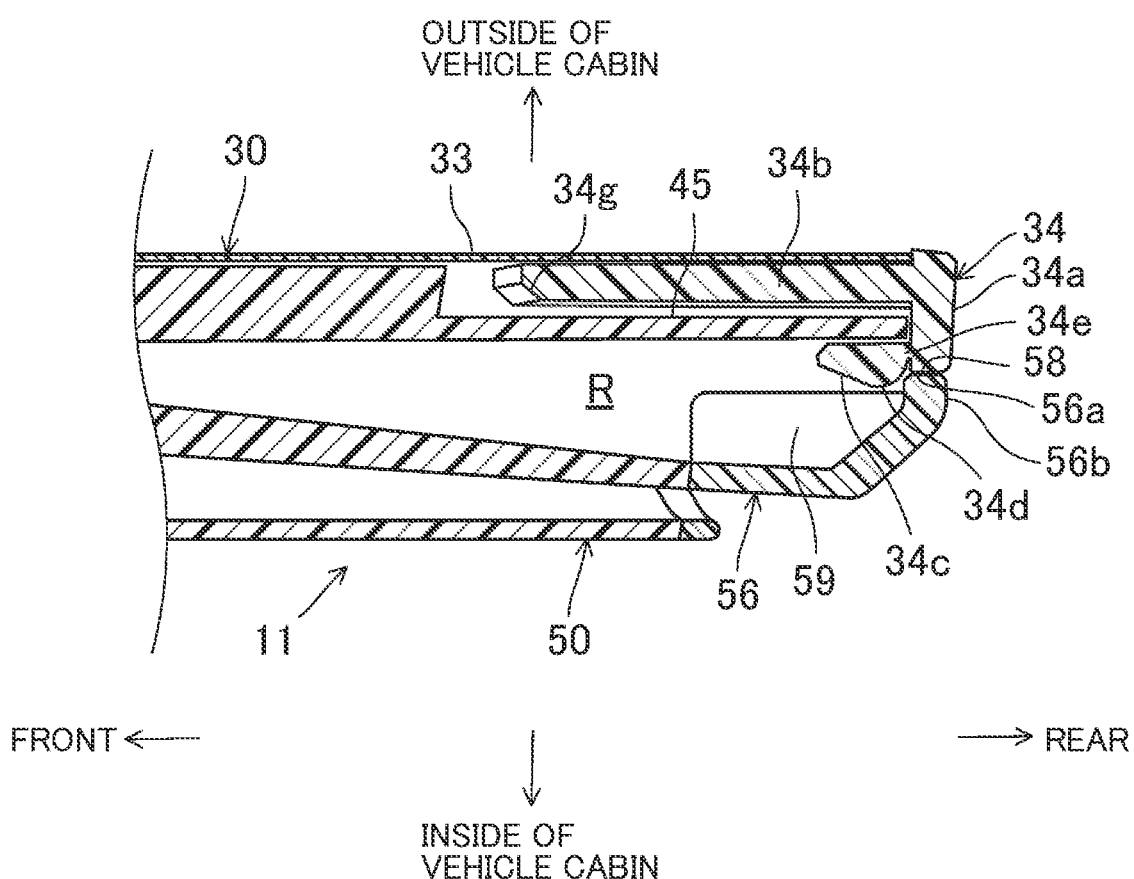
FIG. 7 is a cross-sectional view taken along line VII-VII in FIG. 4.

The locking part 34c is integrally formed on an inner surface of the cover plate 34a facing inside the vehicle cabin. The locking part 34c is in the shape of a tab projecting from the cover plate 34a toward the front end of the molding 30. The length of the locking part 34c in the longitudinal direction is shorter than that of the fixture plate 34b in the longitudinal direction. As illustrated in FIG. 7, the locking part 34c is spaced apart from the inner surface of the fixture plate 34b toward the inside of the vehicle cabin with a certain gap between the locking part 34c and the fixture plate 34b. The locking part 34c has a raised portion 34d raised toward inside of the vehicle cabin.

The dimension of the locking part 34 c in the widthwise direction of the vehicle cabin is determined such that it increases as it goes from the front end of the locking part 34 c toward the top raised portion 34 d, and then decreases as it goes from the top raised portion 34 d toward the root of the locking part 34 c at the cover plate 34 a. The locking part 34 c has a thin portion 34 e close to the root. Since the locking part 34 c has the thin portion 34 e at its root, the locking part 34 c of the end cap 34 is generally swingable about the root while passing through the gap between the rear end of an outer vertical plate 45, which will be described later, of the upper glass run 11 and a protruding portion 56 a, which will be described later, of the inner plate 56 in the glass run die-molded portion 50. This configuration facilitates slidable fitting of the molding 30 to the upper glass run 11. The inner front edge, close to the vehicle cabin, of the fixture plate 34 b is chamfered to form a chamfered portion 34 g. The chamfered portion 34 g allows the fixture plate 34 b to be smoothly moved along the outer vertical plate 45 of the upper glass run 11, which will be described later, when the molding 30 is slidably fitted to the upper glass run 11.

The glass run body 20 of the upper glass run 11 has, on an outer side thereof facing outside the vehicle cabin, an upper fitting portion 23a and a lower fitting portion 23b extending in the longitudinal direction to which the upper fitting portion 31 and lower fitting portion 32 of the molding are fitted, respectively. In other words, a base portion 23c protrudes outward of the vehicle cabin from an outer surface of the outer plate 23 of the glass run body 20 facing outside the vehicle cabin. The base portion 23c is located near the center of the outer surface of the outer plate 23 in the vertical direction, and is continuous in the longitudinal direction.

As illustrated in FIG. 3, the upper fitting portion 23a is a plate-like member projecting upward from the protruding end of the base portion 23c and extending in the longitudinal direction. The upper fitting portion 23a is spaced apart from the outer surface of the outer plate 23 with a gap larger than the thickness of the plate forming the upper fitting portion 31 of the molding 30.

The lower fitting portion 23b is a plate-like member projecting downward from the protruding end of the base portion 23c and extending in the longitudinal direction. The lower fitting portion 23b is spaced apart from the outer surface of the outer plate 23 with a gap larger than the thickness of the plate forming the lower fitting portion 32 of the molding 30.

The upper fitting portion 23a and the lower fitting portion 23b continuously extend from the front end to rear end of the glass run body 20, and function as rails for guiding the molding 30 in the longitudinal direction in mounting the molding 30, which will be described later.

As illustrated in FIG. 3, the upper fitting portion 31 of the molding 30 surrounds the upper fitting portion 23a of the glass run body 20 from above, and in this state, the upper fitting portion 31 is fitted with the upper fitting portion 23a. The lower fitting portion 32 of the molding 30 surrounds the lower fitting portion 23b of the glass run body 20 from below, and in this state, the lower fitting portion 32 is fitted with the lower fitting portion 23b. Once the upper fitting portion 31 and the lower fitting portion 32 are fitted with the upper fitting portion 23a and the lower fitting portion 23b, respectively, the molding 30 is not easily displaced from the glass run body 20 in the widthwise direction and the vertical direction due to the shape of the upper and lower fitting portions 31 and 32.

In the present embodiment, since the upper fitting portion 23a and the lower fitting portion 23b are integrated with the outer plate 23, the upper fitting portion 23a and the lower fitting portion 23b can also be made of the high-stiffness material. Thus, with the upper fitting portion 31 and the lower fitting portion 32 fitted with the upper fitting portion 23a and the lower fitting portion 23b, respectively, the molding 30 does not easily disengage with the glass run body 20.

The glass run body 20 has an upper contact portion 40 toward the outside of the vehicle cabin. The upper contact portion 40 is made of an elastic material, and is in contact with the outer upper surface of the molding 30. The upper contact portion 40 protrudes outward from the outer surface, facing outside the vehicle cabin, of the base of the upper seal lip 24, and is integrally formed with the upper seal lip 24. The upper contact portion 40 is tapered toward the protruding end, or toward the outside of the vehicle cabin, and is continuous in the longitudinal direction. A lower surface of the protruding end of the upper contact portion 40 is in contact with the molding 30 from above to eliminate the gap between the upper portion of the molding 30 and the upper portion of the glass run body 20, thereby providing the vehicle with good appearance.

The upper contact portion 40 is integrally formed with the upper seal lip 24 via the thick base portion 24a, which is thick. When the upper seal lip 24 is elastically deformed in the widthwise direction of the vehicle cabin, the position of the upper contact portion 40 is slightly changed in accordance with the amount and direction of the deformation in the upper seal lip 24. For example, as described above, the upper seal lip 24 is substantially upright when the left front door 1 is open, and the position and shape of the upper contact portion 40 are determined, in this state, such that the lower surface of the leading end of the upper contact portion 40 is in contact with the molding 30 from above. When the left front door 1 is closed, the upper seal lip 24 is elastically deformed and bent obliquely downward toward the outside of the vehicle cabin. Since the upper contact portion 40 is integrally formed with the upper seal lip 24 via the thick base portion 24a, the position of the upper contact portion 40 is slightly changed downwardly toward the outside of the vehicle cabin. Accordingly, the lower surface of the leading end of the upper contact portion 40 makes contact with the molding 30 slightly strongly, and the upper contact portion 40 can be more tightly in contact with the molding 30.

Further, the glass run body 20 has a lower contact portion 41 toward the inside of the vehicle cabin. The lower contact portion 41 is made of an elastic material and is downwardly away from the upper contact portion 40 to make contact with a lower portion of the outer surface of the molding 30 facing outside the vehicle cabin. The lower contact portion 41 bulges outward of the vehicle cabin from the outer surface of the lower seal part 27, and the lower contact portion 41 is integrally formed with the lower seal part 27. The lower contact portion 41 continuously extends in the longitudinal direction. The lower contact portion 41 is in contact with the molding 30 from below to eliminate the gap between the lower portion of the molding 30 and the lower portion of the glass run body 20, thereby providing the vehicle with good appearance.

The lower contact portion 41 and the lower seal part 27 are integrally formed and extend downward from a base portion 27a. Thus, when the lower seal part 27 is elastically deformed, the position of the lower contact portion 41 is changed in accordance with the amount and direction of the deformation in the lower seal part 27. For example, as described above, the lower seal part 27 is in contact with the outer surface of the window glass 4 when the window glass 4 is closed, and the lower seal part 27 may be elastically deformed toward the outside of the vehicle cabin. In this case, the lower contact portion 41 is displaced outward of the vehicle cabin and makes close contact with the molding 30 from below, as a result of which the lower contact portion 41 can be more tightly in contact with the molding 30.

From the outer side of the glass run body 20 facing outside the vehicle cabin, protrusions 23d protrude toward the outside of the vehicle cabin to make contact with the inner surface of the molding 30. Since the protrusions 23d are in contact with the inner surface of the molding 30, a wide portion of the outer plate 23 can be avoided from making contact with the molding 30. The protrusions 23d can be integrally formed with the outer plate 23.

Figure 5:
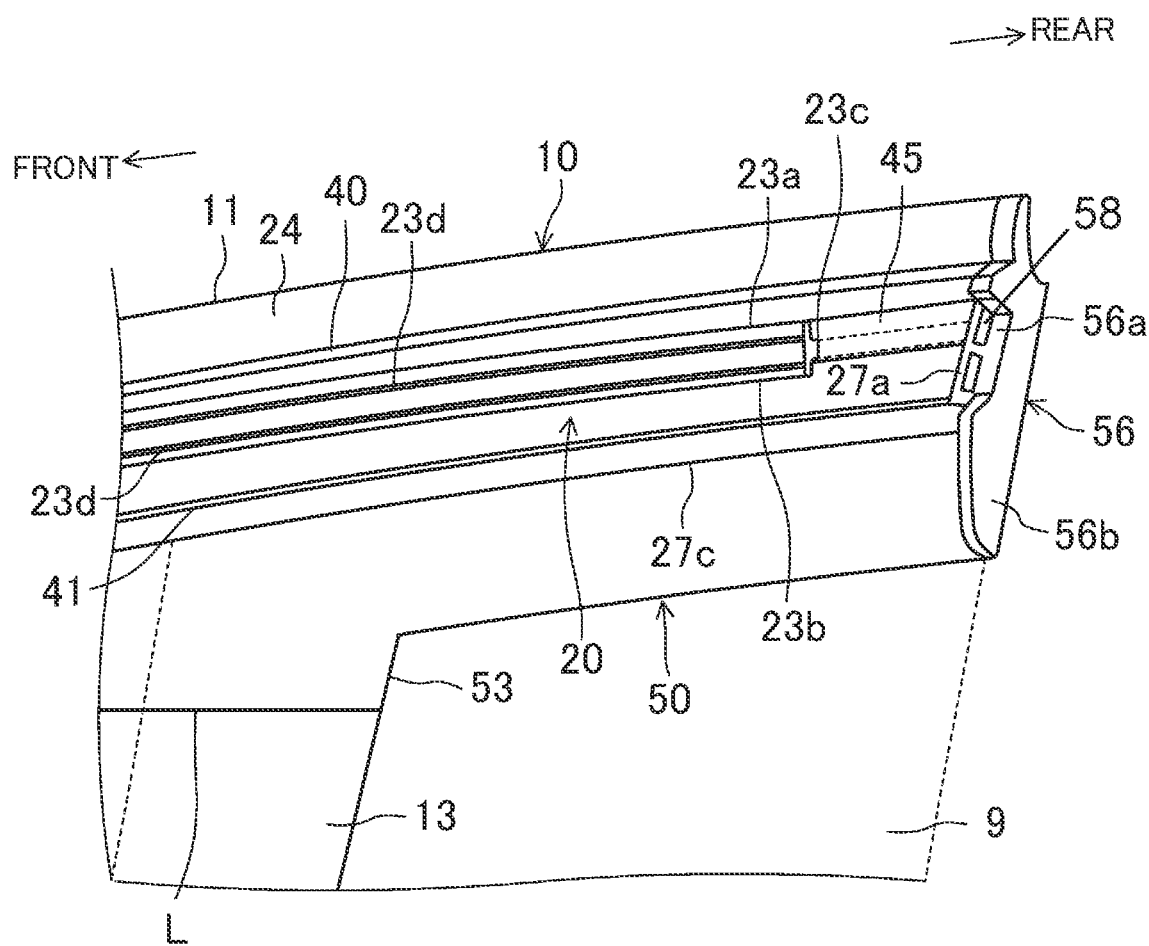
FIG. 5 is a diagram corresponding to FIG. 4 from which a molding is removed.

As illustrated in FIG. 5, at a rear portion (a portion located rearward of the rear vertical glass run 13) of the upper glass run 11, the outer vertical plate 45 disposed at the outer side of the upper glass run and extending in the vertical direction, and the inner plate 56 extending to cover the outer vertical plate 45 from the inner side facing inside the vehicle cabin are disposed.

Figure 14:
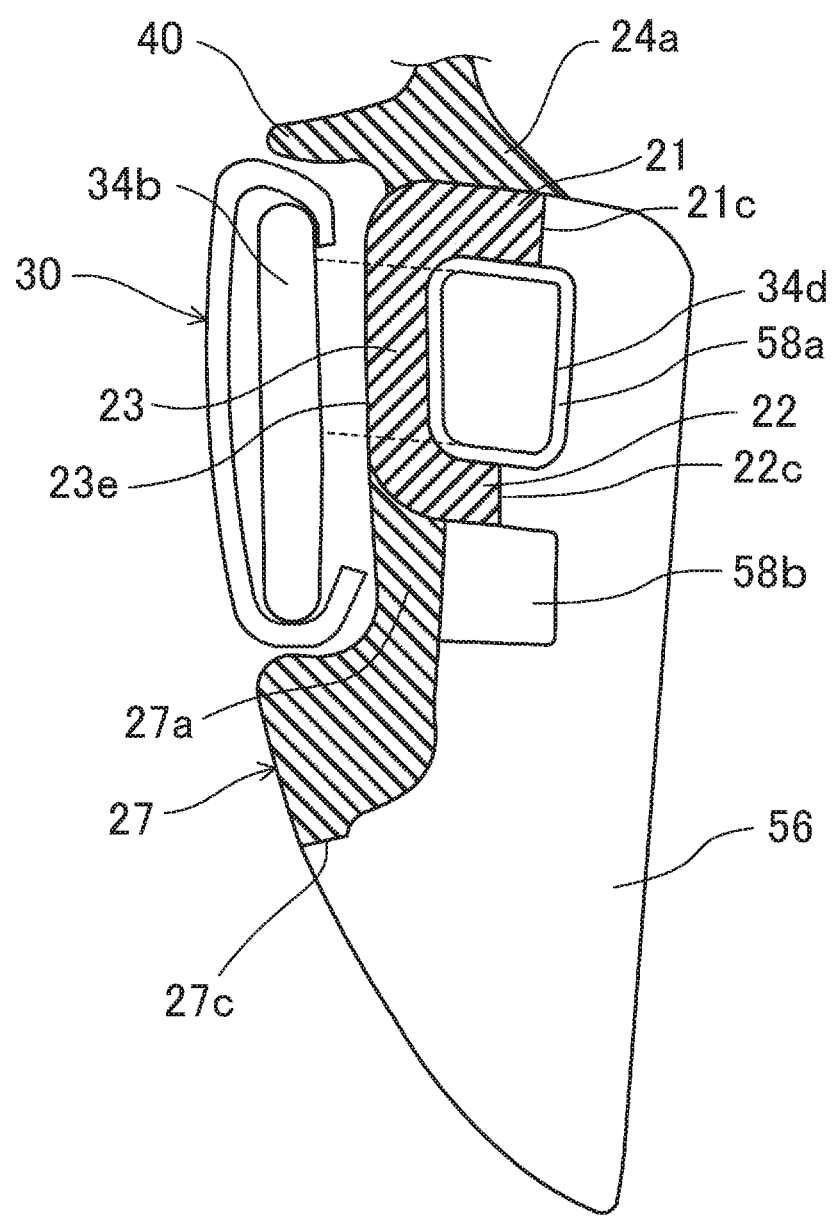
FIG. 14 is a cross-sectional view taken along line XIV-XIV in FIG. 4.

In this configuration, the outer vertical plate 45 can be formed in the following manner. For example, as illustrated in FIG. 3, the upper glass run 11 formed by extrusion molding is cut at some portions, and the remaining portion can be formed as the outer vertical plate 45. Then, as shown in FIG. 14, the inner plate 56 can be integrally formed with the outer vertical plate 45 by die-molding. The cuts in the upper glass run 11 can be positioned as illustrated in FIG. 3, for example. An upper cut 21c can be set, for example, at a position in the upper plate 21 between the outermost upper fitting protrusion 21a and the thick base portion 24a. A middle cut 22c can be set, for example, at a position in the lower plate 22 between the outermost lower fitting protrusion 22a and the outer plate 23. A lower cut 27c can be set at a position in the lower seal part 27 close to the root of a seal lip 27b. An outer cut 23e can be set near the border between the outer plate 23 and the base portion 23c.

The height of the remaining portion on the outer plate 23 after the base portion 23c is cut off is not limiting and may be any height that allows the fixture plate 34b to be smoothly moved when the end cap 34, which is a positioning member, is slidably fitted to the upper glass run 11, but it is preferred to make the remaining portion as small as possible.

In a preferred embodiment, the length of the base portion 23c in the vehicle longitudinal direction cut from the outer plate 23 is slightly longer than the length of the fixture plate 34b of the end cap 34 in the vehicle longitudinal direction. For example, as illustrated in FIG. 14, the inner surface of the outer plate 23 facing inside the vehicle cabin, the lower surface of the upper plate 21, the upper surface of the lower plate 22, and the upper recessed portion of the inner plate 56 can form a tunnel-shaped upper insertion slot 58a. In the same manner, the inner surface, facing inside the vehicle cabin, of the base portion 27a of the lower seal part 27, the lower surface of the lower plate 22, and a lower recessed portion of the inner plate 56 can form a tunnel-shaped lower insertion slot 58b.

As illustrated in FIG. 5, the upper fitting portion 23a and the lower fitting portion 23b extend to be adjacent to the outer vertical plate 45. The rear ends of the upper fitting portion 23a and lower fitting portion 23b are located forward of the rear end of the outer vertical plate 45.

The upper glass run 11 has an insertion slot 58 at its rear end (an end in the vehicle longitudinal direction) in which the locking part 34c of the end cap 34 secured to the molding 30 is inserted. The insertion slot 58 is formed between the outer vertical plate 45 and the inner plate 56. As illustrated in FIG. 7, the locking part 34c inserted in the insertion slot 58 is accommodated in a chamber R defined by the outer vertical plate 45 and the inner plate 56. The dimension of the chamber R in the widthwise direction of the vehicle cabin is larger than that of the locking part 34c in the same direction.

A peripheral portion of the insertion slot 58 in the inner plate 56 is a protruding portion 56a protruding further outward of the vehicle cabin than the outer surface of a shelf portion 59. The locking part 34c inserted in the insertion slot 58 is positioned forward of the protruding portion 56a, and is engaged with, and locked to, the protruding portion 56a from the front. Thus, the locking part 34c is locked to the rear end of the upper glass run 11, which substantially prevents the locking part 34c from being disengaged from the insertion slot 58.

The end cap 34 secured to the molding 30 facilitates exact positioning of the molding 30 relative to the upper glass run 11 when the molding 30 is slidably fitted to the upper glass run 11, and can prevent the molding 30 from moving relative to the upper glass run 11 after installation.

As illustrated in FIG. 7, the rear end surface (end surface in the vehicle longitudinal direction) of the end cap 34 and the rear end surface (end surface in the vehicle longitudinal direction) 56b of the upper glass run 11 are substantially flush with each other when the locking part 34c is locked to the rear end of the upper glass run 11. To achieve this flushness, the distance between the rear end surface (end surface in the vehicle longitudinal direction) 56b of the upper glass run 11 and the rear end surface (end surface in the vehicle longitudinal direction) of the outer vertical plate 45 is substantially equal to the thickness of the cover plate 34a of the end cap 34 in the vehicle longitudinal direction. This configuration can make the rear end surfaces of the upper glass run 11 and the molding 30 mounted to the upper glass run 11 substantially coincide with each other in the vehicle longitudinal direction, which can give the vehicle with more sophisticated appearance.

When the locking part 34c is locked to the upper glass run 11, the outer vertical plate 45 is located between the locking part 34c and the fixture plate 34b. In other words, the gap between the locking part 34c and the fixture plate 34b in the widthwise direction of the vehicle cabin is slightly larger than the thickness of the outer vertical plate 45 to allow the outer vertical plate 45 to enter therein. Since the outer vertical plate 45 is inserted between the locking part 34c and the fixture plate 34b and the raised portion 34d of the end cap 34 is engaged with the protruding portion 56a of the glass run inner plate 56, the end cap 34 can be prevented from moving out of the certain mounting position in the widthwise direction of the vehicle cabin, thereby providing the vehicle with more sophisticated appearance.

(Coating for Reducing Slide Resistance)

In the present embodiment, the molding 30 is slidably assembled to the glass run body 20 from one end in the longitudinal direction. To enable a worker to manually assemble the molding 30, the glass run body 20 has a structure that can reduce slide resistance to the molding 30.

In other words, the upper contact portion 40 has an elastic upper coating 40a at a portion in contact with the molding 30. The upper coating 40a has a lower slide resistance to the molding 30 than the elastic material of the portion of the upper contact portion 40 covered with the upper coating 40a. Specifically, the portion of the upper contact portion 40 covered with the upper coating 40a is made of the same elastic material as the upper seal lip 24 or the like, but the upper coating 40a is made of an olefin-based resin material mixed with silicon to have a lower coefficient of dynamic friction than the elastic material of the upper seal lip 24 or the like. The upper coating 40*a* may be made of other materials than the olefin-based resin mixed with silicon.

In one preferred embodiment, the coefficient of dynamic friction of the upper coating 40*a* is 0.5 or lower. The coefficient of dynamic friction of the upper coating 40*a* can be changed as appropriate by changing the content of silicon mixed. The portion of the upper contact portion 40 covered with the upper coating 40*a* has a coefficient of dynamic friction of about 0.6.

Described herein is a method of measuring the coefficient of dynamic friction. The coefficient of dynamic friction can be measured by using the method disclosed in Japanese Unexamined Patent Publication No. H09-123761. The coefficients of dynamic friction described above are measured by this method. For measurement, a surface analyzer "HEIDON-14D" manufactured by Shinto Scientific Co., Ltd. was used, and the coefficient of dynamic friction was measured by using a circular concave plate of metal. In other words, as illustrated in FIG. 3 of Japanese Unexamined Patent Publication No. H09-123761, the coefficient of dynamic friction was measured such that the circular metal plate was pushed onto the upper surface of a specimen under a load of 1 kgf, and was moved relative to the specimen at a velocity of 1000 mm/min.

The lower contact portion 41 has a lower coating 41*a* at a portion in contact with the molding 30. The lower coating 41*a* has a lower coefficient of dynamic friction to the molding 30 than the elastic material of the portion of the lower contact portion 41 covered with the lower coating 41*a*. The lower coating 41*a* is made of the same material as that of the upper coating 40*a*, and may have a thickness equal to that of the upper coating 40*a*.

(Method of Assembly of Automobile Door Glass Run)

Described next is a method of assembly of the left front door glass run 10 having the structure described above. Before the glass run body 20 is mounted to the window frame 3, a portion supposed to extend along the upper frame portion 3*a* (upper glass run 11) has a linear shape. The molding 30 has a curved shape in advance to conform to the shape of the upper frame portion 3*a* of the window frame 3. Before the assembly, the end cap 34 is crimped to the end portion of the molding 30. Any known methods can be used to crimp the end cap 34 to the molding 30, and the description thereof is omitted.

The upper fitting portion 23*a* and lower fitting portion 23*b* of the glass run body 20 are respectively fitted with the upper fitting portion 31 and lower fitting portion 32 of the molding 30 from the front end, and then the glass run body 20 is allowed to slide in the longitudinal direction relative to the molding 30 to mount the glass run body 20 to the molding 30. This process is referred to as a slidably mounting process.

Figure 8:
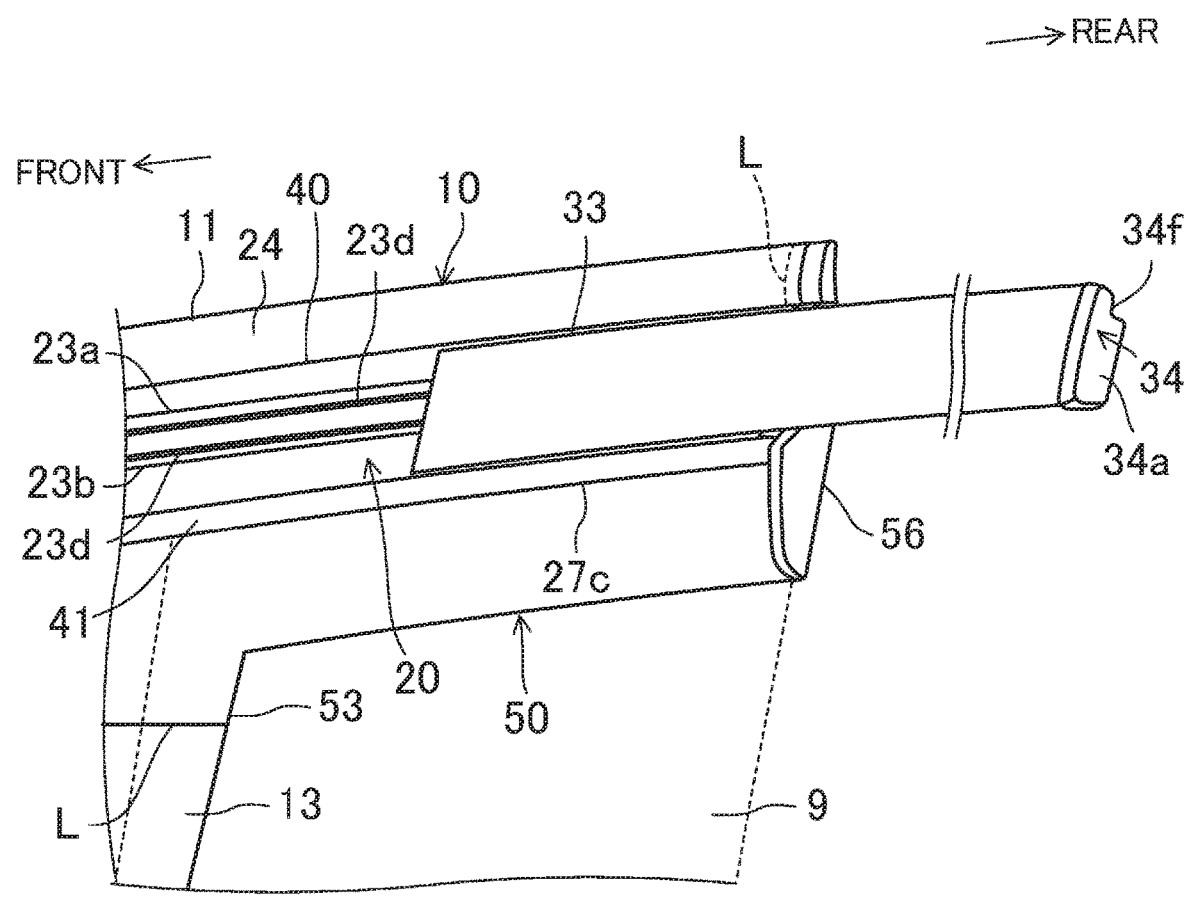
FIG. 8 is a diagram corresponding to FIG. 4, illustrating a state during assembly of the molding.

In the slidably mounting process, first, the rear ends of the upper fitting portion 23*a* and lower fitting portion 23*b* of the glass run body 20 are fitted with the front ends of the upper fitting portion 31 and lower fitting portion 32 of the molding 30. After the upper fitting portion 23*a* and the lower fitting portion 23*b* are fitted with the upper fitting portion 31 and the lower fitting portion 32, the glass run body 20 is allowed to slide forward relative to the molding 30. FIG. 8 illustrates a state during the slidably mounting process.

Since the molding 30 is curved and the upper glass run 11 of the glass run body 20 is linear as described above, the upper contact portion 40 of the glass run body 20, in particular, makes close contact with the upper fitting portion 31 of the molding 30 while the glass run body 20 is sliding. The lower contact portion 41 of the glass run body 20 may make contact with the lower fitting portion 32 of the molding 30.

Since the portion of the upper contact portion 40 in contact with the molding 30 is covered with the upper coating 40*a* having a lower coefficient of dynamic friction to the molding 30 than the upper contact portion 40, the slide resistance between the upper portion of the molding 30 and the upper contact portion 40 is reduced. Further, since the portion of the lower contact portion 41 in contact with the molding 30 is covered with the lower coating 41*a* having a lower coefficient of dynamic friction to the molding 30 than the lower contact portion 41, the slide resistance between the lower portion of the molding 30 and the lower contact portion 41 is reduced. This structure facilitates the manual mounting of the glass run body 20 to the molding 30 by a worker, which eliminates the need for machinery for mounting the molding. When the front end of the molding 30 meets the front end of the upper glass run 11 of the glass run body 20, the worker stops the sliding operation.

Immediately before the front end of the molding 30 reaches the front end of the upper glass run 11 of the glass run body 20, the locking part 34*c* of the end cap 34 starts entering the insertion slot 58 formed at the rear end of the upper glass run 11. The locking part 34*c* of the end cap 34 moves beyond the protruding portion 56*a* that is a peripheral portion of the insertion slot 58. When the front end of the molding 30 reaches the front end of the upper glass run 11 of the glass run body 20, the locking part 34*c* of the end cap 34 goes beyond the protruding portion 56*a* to be fully inserted into the insertion slot 58 of the upper glass run 11. Thus, the locking part 34*c* is engaged with the protruding portion 56*a*.

The locking part 34*c* of the end cap 34, which has the thin portion 34*e* at its root, can swing during this insertion process. This structure facilitates the mounting, and substantially prevents the locking part 34*c* from being disengaged after the insertion.

When the glass run body 20 is mounted to the molding 30 as described above, the assembly of the left front door glass run 10 is completed.

Since the molding 30 is curved upward, the upper portion of the molding 30 makes closer contact with the glass run body 20 than the lower portion of the molding 30. In this regard, the glass run body 20 may have at least the upper coating 40*a*, and may exclude the lower coating 41*a*.

In the slidably mounting process, the glass run body 20 is allowed to slide relative to the molding 30, but the molding 30 may slide relative to the glass run body 20.

(Automobile Door Glass Run in Use)

To attach the left front door glass run 10 to the left front door 1, the left front door glass run 10 is mounted to the glass run mount plate 8 of the window frame 3 with the lower fitting protrusions 21*a* of the upper plate 21 and the upper fitting protrusions 22*a* of the lower plate 22 being in contact with the upper surface and lower surface of the glass run mount plate 8, respectively. With the front door glass run 10 mounted in this state, the glass run body 20 is firmly attached to the glass run mount plate 8 since the upper plate 21, the lower plate 22, and the outer plate 23 have a flexural modulus of from 2000 MPa or higher to 5000 MPa or lower.

When the left front door 1 is closed, the upper seal lip 24 and the inner seal lip 25 of the glass run body 20 make contact with the vehicle body 100 of the automobile, and are elastically deformed to bend outward of the vehicle cabin. Thus, the upper seal lip 24 and the inner seal lip 25 can provide a seal between the window frame 3 and the vehicle body 100. In this state, the position of the upper contact portion 40, which is located at the outer side of the thick base portion 24a of the upper seal lip 24 toward the vehicle cabin, is slightly outwardly changed due to the elastic deformation of the upper seal lip 24. This allows the upper contact portion 40 to make closer contact with the outer upper surface of the molding 30. This structure can eliminate the gap between the upper contact portion 40 and the molding 30, thereby providing the vehicle with good appearance.

Advantages of Embodiment

According to the first embodiment, ends of the upper and lower molding fitting portions 31 and 32 of the molding 30 are respectively fitted with ends of the fitting portions 23a and 23b disposed at the outer side, facing outside the vehicle cabin, of the upper glass run 11, and then the molding 30 is allowed to slide in the vehicle longitudinal direction relative to the upper glass run 11 to be mounted to the glass run body 20. This configuration allows a worker to easily mount the molding 30.

When the molding 30 is mounted to the upper glass run 11, the locking part 34c of the end cap 34 is inserted in the insertion slot 58 of the upper glass run 11 and is locked to the upper glass run 11. This configuration substantially prevents the locking part 34c of the end cap 34 from being disengaged from the insertion slot 58 of the upper glass run 11 if external force is applied to the molding 30 in the vehicle longitudinal direction, and can prevent the molding 30 from being misaligned with the certain mounting position. This keeps a gap of a predetermined size between the molding 30 and other parts of the vehicle, thereby providing the vehicle with good appearance, and preventing the molding from interfering with other parts (e.g., front end of a rear door molding) when the door 1 is opened or closed. This can also prevent the misalignment of the molding 30, thereby reducing wind noise while the vehicle is running.

Second Embodiment

FIGS. 9 to 12 are diagrams illustrating a second embodiment of the present disclosure. The second embodiment differs from the first embodiment in the mounting structure of a molding 30. Like parts of the second embodiment similar to those of the first embodiment are designated by like reference characters and description thereof is omitted, and parts different from those of the first embodiment will be described in detail.

Figure 9:
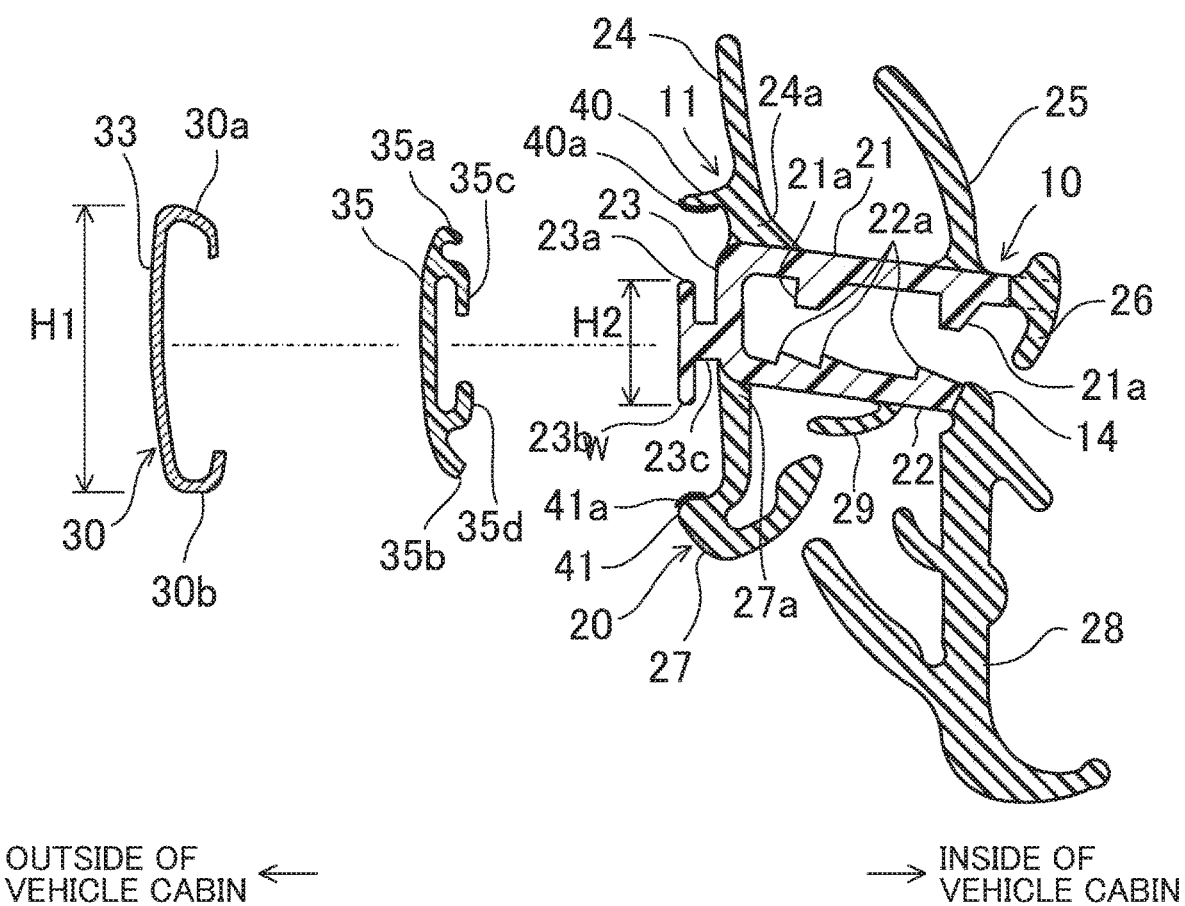
FIG. 9 is an exploded cross-sectional view corresponding to FIG. 2, illustrating an automobile door glass run according to a second embodiment of the present disclosure.
Figure 10:
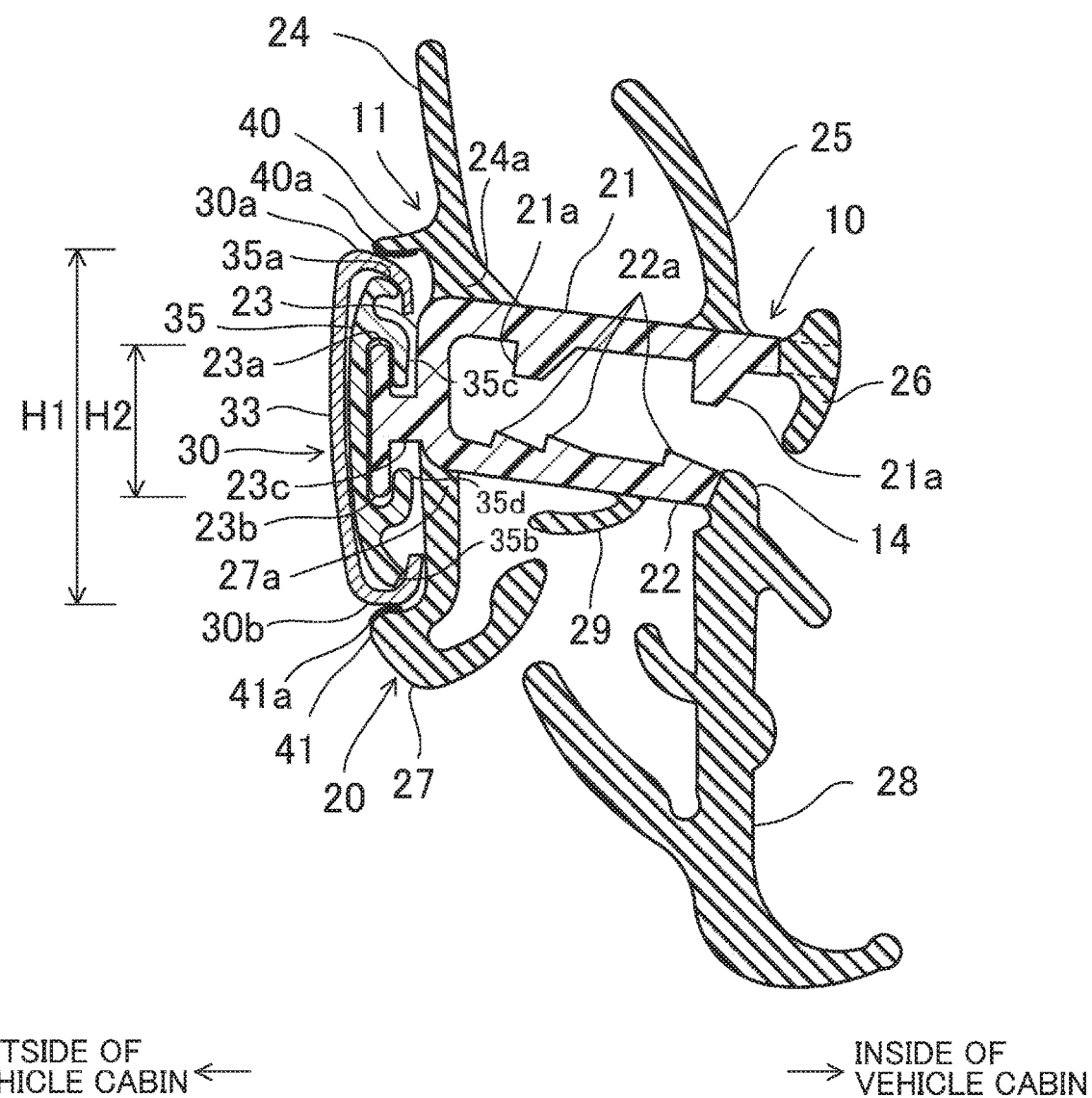
FIG. 10 is a diagram corresponding to FIG. 2, illustrating the second embodiment.
Figure 11:
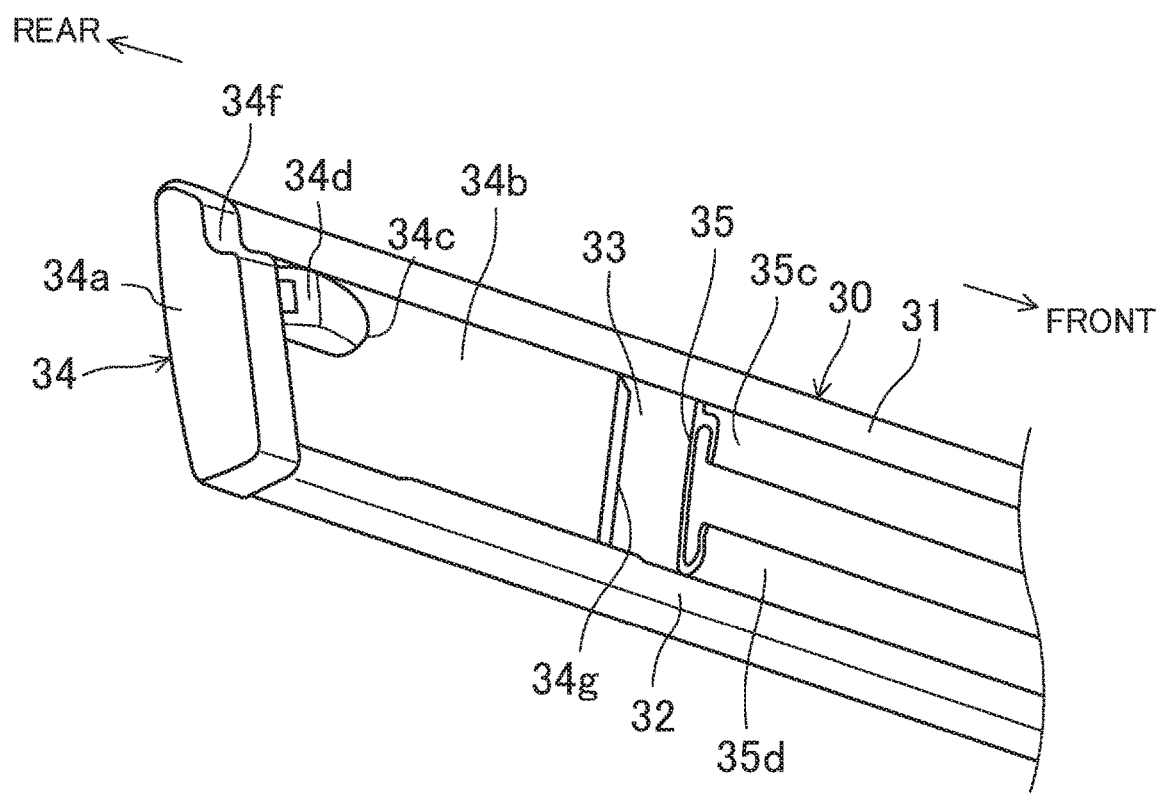
FIG. 11 is a diagram corresponding to FIG. 6, illustrating the second embodiment.
Figure 12:
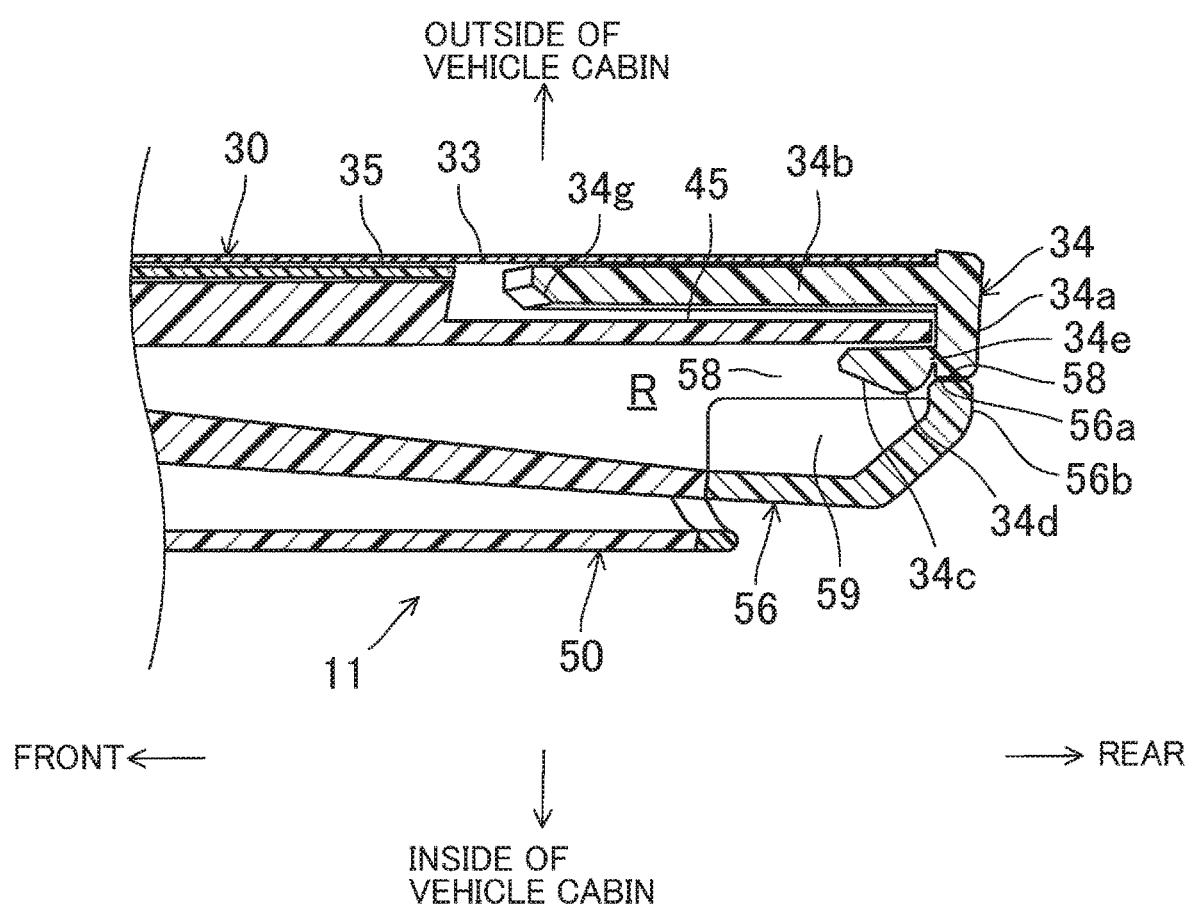
FIG. 12 is a diagram corresponding to FIG. 7, according to the second embodiment.

In the second embodiment, as illustrated in FIGS. 9 and 10, a vertical dimension H1 of the molding 30 is larger than the vertical dimension of the molding 30 according to the first embodiment. An increase in the vertical dimension H1 of the molding 30 requires a larger vertical dimension H2 between the upper fitting portion 23a and the lower fitting portion 23b, but since the upper fitting portion 23a and the lower fitting portion 23b are made of a high-stiffness material, a larger vertical dimension H2 would prevent the glass run body 20 from curving in conformance to the shape of the window frame 3 in mounting the left front door glass run 10 to the left front door 1.

In the second embodiment, to mount a molding 30 with a larger vertical dimension H1 without increasing the dimension H2 between the upper fitting portion 23a and the lower fitting portion 23b, the molding 30 includes a separate resin member 35. The resin member 35 is a long member constituting part of the molding 30 and extends along the body (metal body) of the molding 30 in the longitudinal direction. The resin member 35 may be made of a material having a lower stiffness than the upper plate 21, the lower plate 22 and the outer plate 23.

The molding 30 has an upper bent portion 30a bending toward the inside of the vehicle cabin and a lower bent portion 30b bending toward the inside of the vehicle cabin at the upper and lower ends of the body of the molding 30.

The resin member 35 has, at upper and lower ends thereof, an upper protruding portion 35a to be fitted to the inside of the upper bent portion 30a, and a lower protruding portion 35b to be fitted to the inside of the lower bent portion 30b. The resin member 35 is fixed to the body of the molding 30 with the upper protruding portion 35a and the lower protruding portion 35b being fitted in the upper bent portion 30a and the lower bent portion 30b, respectively.

The resin member 35 has upper and lower fitting portions 35c and 35d formed at an upper portion and a lower portion of a side thereof facing inside the vehicle cabin. The upper and lower fitting portions 35c and 35d are fitted to an outer side of the glass run body 20 facing outside the vehicle cabin and extend in the longitudinal direction. As illustrated in FIG. 10, the upper fitting portion 35c and the lower fitting portion 35d are respectively fitted with the upper fitting portion 23a and the lower fitting portion 23b of the glass run body 20. The vertical dimension between the upper fitting portion 35c and the lower fitting portion 35d is smaller than the vertical dimension between the upper bent portion 30a and the lower bent portion 30b.

In the second embodiment, the molding 30 can be mounted to the glass run body 20 after the resin member 35 is mounted to the body of the molding 30. In this case, the upper coating 40a and lower coating 41a of the glass run body 20 respectively make contact with the upper and lower portions of the body of the molding 30.

The second embodiment can provide the same advantages as those of the first embodiment.

Other Embodiments

The embodiments described above are presented for illustrative purposes only in any aspects, and should not be construed as limiting the scope of the present disclosure. It is understood that numerous alterations and modifications within the scope of the appended claims and equivalents thereof are indeed within the scope of the present disclosure.

Figure 13:
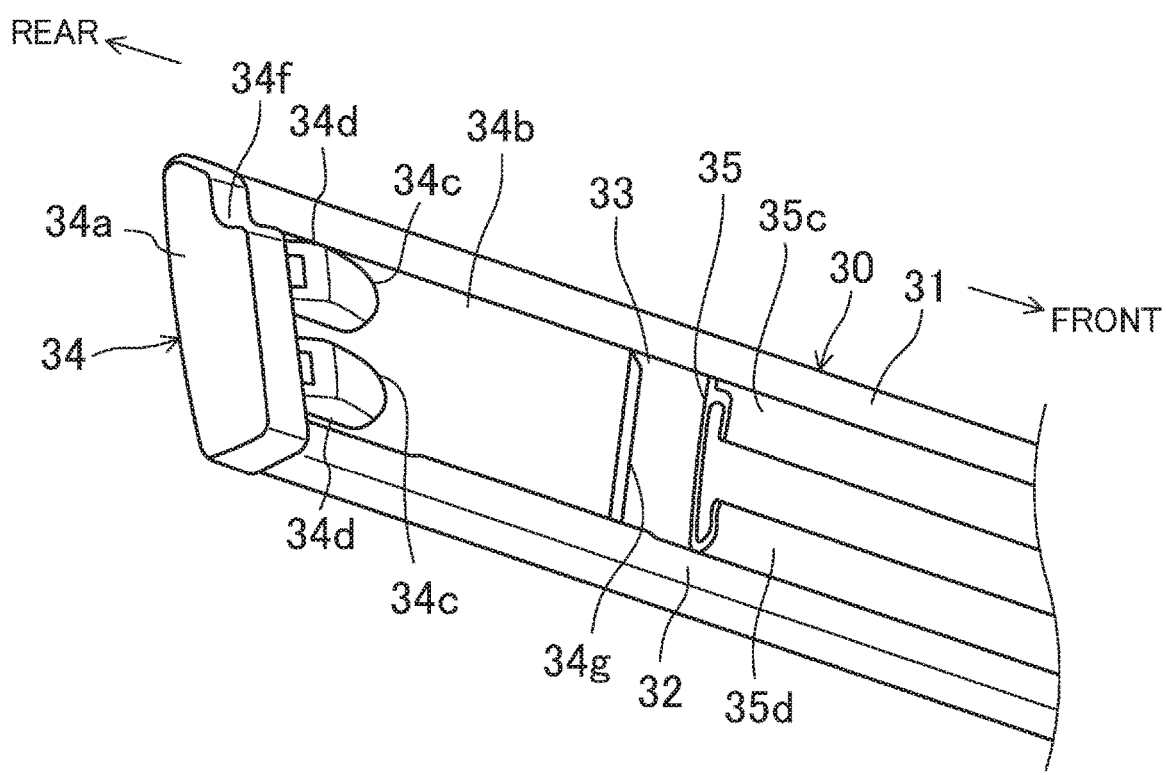
FIG. 13 is a diagram corresponding to FIG. 6, illustrating a modification of the present disclosure.

As illustrated in FIG. 13, the end cap 34 may include a plurality of locking parts 34c that are spaced apart in the vertical direction. The locking parts 34c are inserted into corresponding insertion slots 58 of the upper glass run 11 and locked to the upper glass run 11. With this structure, the end cap 34 is more firmly secured to the upper glass run 11. The number of locking parts 34c is not limited to two. If the cross-sectional shape of the upper glass run 11 permits, the end cap 34 may include three locking parts 34c, which are not illustrated.

In the embodiments above, the end cap 34 has been described as the positioning member, but the positioning member does not necessarily have a cap shape.

As described above, the present disclosure can be used for a glass run mounted to a window frame of an automobile door.

What is claimed is:

1. An automobile door glass run mounted to an outer side, facing outside a vehicle cabin, of a window frame defining a window opening of an automobile door to provide a seal between the window frame and a window glass, the automobile door glass run comprising:
- a glass run body that includes an upper glass run which is mounted to a glass run mount plate extending toward the outside of the vehicle cabin from an upper portion of the window frame, the upper glass run extending in a vehicle longitudinal direction; and
- a molding which is mounted to an outer side, facing the outside of the vehicle cabin, of the upper glass run and extending in the vehicle longitudinal direction, wherein
- the upper glass run includes an outer vertical plate disposed at the outer side of the upper glass run and extending in a vertical direction, and an inner plate covering an inner side, facing inside the vehicle cabin, of the outer vertical plate, wherein the outer vertical plate and the inner plate together form a receptacle having an insertion opening extending through an end face formed by the outer vertical plate and the inner plate,
- the inner plate is integrally formed with the outer vertical plate by die-molding such that the insertion opening is surrounded by the end face formed by the outer vertical plate and the inner plate,
- the molding has, at an upper side and lower side thereof, an upper fitting portion and a lower fitting portion which are fitted to the outer side of the upper glass run and extend in the vehicle longitudinal direction,
- the upper glass run has, at the outer side thereof, fitting portions which extend in the vehicle longitudinal direction and to which the upper and lower fitting portions are fitted,
- a positioning member is secured to an end of the molding in the vehicle longitudinal direction, the positioning member including a locking part projecting toward another end of the molding,
- the receptacle of the upper glass run and the insertion opening are respectively configured so that the locking part of the positioning member is inserted in the insertion opening in the vehicle longitudinal direction, and
- the locking part of the positioning member is inserted in the insertion opening and is locked to the upper glass run.

2. The automobile door glass run of claim 1, wherein the positioning member is an end cap formed to cover an end surface of the molding.

3. The automobile door glass run of claim 2, wherein an end surface of the positioning member in the vehicle longitudinal direction and an end surface of the upper glass run in the vehicle longitudinal direction are substantially flush with each other.

4. The automobile door glass run of claim 2, wherein
- the positioning member includes a cover plate extending in the vertical direction to cover the end surface of the molding, and
- the locking part is integrally formed with an inner side, facing inside the vehicle cabin, of the cover plate.

5. The automobile door glass run of claim 2, wherein
- the positioning member has a cover plate,
- the cover plate has a shape and a size which keep a rear end surface of the molding invisible when the molding to which a fixture plate of the positioning member is fixed is viewed from a rear end of the molding in the vehicle longitudinal direction,
- an upper portion of the cover plate, facing inside the vehicle cabin, is cut out to form a recess, and
- the inner plate has a raised portion capable of engaging with the recess, and the recess is fitted with the raised portion.

6. The automobile door glass run of claim 1, wherein
- a peripheral portion of the insertion opening in the inner plate is a protruding portion protruding toward the outside of the vehicle cabin, and
- the locking part of the positioning member has a raised portion raised toward the inside of the vehicle cabin to be engaged with the protruding portion.

7. The automobile door glass run of claim 6, wherein
- the positioning member includes a fixture plate extending along an inner surface, facing inside the vehicle cabin, of the molding and fixed to the molding, and
- the outer vertical plate is disposed between the locking part and the fixture plate.

8. The automobile door glass run of claim 6, wherein
- the inner plate is provided with a shelf portion,
- the protruding portion protrudes further outward of the vehicle cabin than the shelf portion, and
- the locking part inserted in the insertion opening is located deeper in the insertion slot opening than the protruding portion and is engaged with, and locked to, the protruding portion.

9. The automobile door glass run of claim 1, wherein
- the insertion opening comprises a plurality of insertion openings,
- the locking part of the positioning member includes a plurality of locking parts spaced apart from each other in the vertical direction, and
- the plurality of locking parts is inserted in the plurality of insertion openings and is locked to the upper glass run.

10. The automobile door glass run of claim 1, wherein the insertion opening is defined by an inner surface, facing inside the vehicle cabin, of the outer vertical plate of the glass run body, a lower surface of an upper plate of the glass run body, an upper surface of a lower plate of the glass run body, and an upper recessed portion of the inner plate.

11. The automobile door glass run of claim 10, wherein the insertion opening is a first insertion opening,
- the automobile door glass run further including a second insertion opening slot formed below the first insertion opening, the second insertion opening being surrounded by an inner surface, facing inside the vehicle cabin, of a base portion of a lower seal part protruding downward, a lower surface of the lower plate of the glass run body, and a lower recessed portion of the inner plate.

12. The automobile door glass run of claim 1, wherein the insertion opening is a first insertion opening,
- the automobile door glass run further including second insertion opening formed below the first insertion opening, the second insertion opening being surrounded by an inner surface, facing inside the vehicle cabin, of a base portion of a lower seal part protruding downward, a lower surface of a lower plate of the glass run body, and a lower recessed portion of the inner plate.

* * * * *